(12) United States Patent
Sipka et al.

(10) Patent No.: US 10,956,271 B2
(45) Date of Patent: Mar. 23, 2021

(54) POINT-IN-TIME COPY ON A REMOTE SYSTEM

(71) Applicant: International Business Machines Corporation, Armonk, NY (US)

(72) Inventors: Andrea Sipka, Pordenone (IT); John P. Wilkinson, Salisbury (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/735,415

(22) Filed: Jan. 6, 2020

(65) Prior Publication Data

US 2020/0142778 A1    May 7, 2020

Related U.S. Application Data

(62) Division of application No. 15/670,674, filed on Aug. 7, 2017, now Pat. No. 10,585,756.

(51) Int. Cl.
| | |
|---|---|
| *G06F 12/00* | (2006.01) |
| *G06F 11/14* | (2006.01) |
| *G06F 3/06* | (2006.01) |
| *G06F 11/20* | (2006.01) |
| *G06F 16/11* | (2019.01) |

(52) U.S. Cl.
CPC ......... *G06F 11/1446* (2013.01); *G06F 3/065* (2013.01); *G06F 3/067* (2013.01); *G06F 3/0611* (2013.01); *G06F 3/0619* (2013.01); *G06F 11/2071* (2013.01); *G06F 16/125* (2019.01); *G06F 16/128* (2019.01)

(58) Field of Classification Search
CPC .................. G06F 11/1446; G06F 11/1449
See application file for complete search history.

(56) References Cited

U.S. PATENT DOCUMENTS

| | | |
|---|---|---|
| 5,339,407 A | 8/1994 | Goldman et al. |
| 6,467,054 B1 | 10/2002 | Lenny |

(Continued)

FOREIGN PATENT DOCUMENTS

| | | |
|---|---|---|
| WO | 2009020978 A2 | 2/2009 |

OTHER PUBLICATIONS

Sipka et al., U.S. Appl. No. 16/735,347, filed Jan. 6, 2020.

(Continued)

*Primary Examiner* — Baboucarr Faal
(74) *Attorney, Agent, or Firm* — Zilka-Kotab, P.C.

(57) ABSTRACT

A computer-implemented method, according to one embodiment, includes: receiving existing data at a secondary storage volume in a secondary system from a primary storage volume in a primary system. In response to receiving a write request at the secondary system: a determination is made as to whether data corresponding to the write request will fully overwrite one or more of the regions in the secondary storage volume. A request is sent to the primary system for existing data corresponding to the secondary storage volume in response to determining that the data corresponding to the write request will not overwrite a portion of a region in the secondary storage volume. The requested existing data is received, and merged with the data corresponding to the write request. The merged data is further written to the one or more respective regions in the secondary storage volume.

20 Claims, 11 Drawing Sheets

(56) References Cited

U.S. PATENT DOCUMENTS

| | | |
|---|---|---|
| 6,785,789 B1 | 8/2004 | Kekre et al. |
| 6,996,733 B2 | 2/2006 | Hershenson et al. |
| 7,032,089 B1 | 4/2006 | Ranade et al. |
| 7,149,787 B1 | 12/2006 | Mutalik et al. |
| 7,174,451 B2 | 2/2007 | Zimmer et al. |
| 7,359,927 B1 | 4/2008 | Cardente |
| 7,386,695 B2 | 6/2008 | Fuente |
| 7,490,268 B2 | 2/2009 | Keromytis et al. |
| 7,536,523 B2 | 5/2009 | Yagawa et al. |
| 7,571,290 B1 | 8/2009 | Ranade et al. |
| 7,941,622 B2 | 5/2011 | Yagawa et al. |
| 8,001,085 B1 | 8/2011 | Kiselev |
| 8,074,019 B2 | 12/2011 | Gupta et al. |
| 8,359,491 B1 | 1/2013 | Bloomstein |
| 8,458,517 B1 | 6/2013 | Vermeulen et al. |
| 8,560,886 B1 | 10/2013 | Kekre et al. |
| 8,788,772 B2 | 7/2014 | Clayton et al. |
| 8,793,527 B1 | 7/2014 | Franks |
| 9,003,142 B2 | 4/2015 | Blea et al. |
| 9,164,846 B2 | 10/2015 | Lang et al. |
| 9,405,483 B1 * | 8/2016 | Wei .......................... G06F 3/065 |
| 9,417,971 B2 | 8/2016 | Agombar et al. |
| 9,514,004 B2 | 12/2016 | Beeken |
| 9,959,061 B1 | 5/2018 | Natanzon et al. |
| 10,585,756 B2 | 3/2020 | Sipka et al. |
| 2002/0035706 A1 | 3/2002 | Connor et al. |
| 2005/0071549 A1 | 3/2005 | Tross et al. |
| 2005/0283504 A1 | 12/2005 | Suzuki et al. |
| 2006/0182020 A1 | 8/2006 | Factor et al. |
| 2007/0271313 A1 | 11/2007 | Mizuno et al. |
| 2008/0072003 A1 | 3/2008 | Vu et al. |
| 2008/0244205 A1 * | 10/2008 | Amano ............... G06F 11/1469 711/162 |
| 2010/0094802 A1 | 4/2010 | Luotojarvi et al. |
| 2011/0167044 A1 | 7/2011 | Hiwatashi et al. |
| 2011/0167236 A1 | 7/2011 | Orikasa et al. |
| 2013/0036091 A1 | 2/2013 | Provenzano et al. |
| 2013/0036098 A1 | 2/2013 | Mutalik et al. |
| 2014/0201426 A1 | 7/2014 | Ma |
| 2015/0331753 A1 | 11/2015 | Nakajima et al. |
| 2015/0378832 A1 | 12/2015 | Brown et al. |
| 2016/0004602 A1 | 1/2016 | Wilkinson |
| 2017/0286234 A1 * | 10/2017 | Shulga ................. G06F 9/4401 |
| 2019/0042371 A1 | 2/2019 | Sipka et al. |
| 2020/0142776 A1 | 5/2020 | Sipka et al. |
| 2020/0142777 A1 | 5/2020 | Sipka et al. |

OTHER PUBLICATIONS

Sipka et al., U.S. Appl. No. 16/735,367, filed Jan. 6, 2020.
List of IBM Patents or Patent Applications Treated as Related.
Notice of Allowance from U.S. Appl. No. 16/735,347, dated Oct. 23, 2020.
"High availability disaster recovery (HADR)", http://www-01.ibm.com/support/knowledgecenter/api/content/nl/en-us/, retrieved Apr. 9, 2015, 2 pages.
United Kingdom Search Report and Written Opinion from PCT Application No. GB920140046GB1, dated Jan. 12, 2015.
Wilkinson, J., U.S. Appl. No. 14/735,886, filed Jun. 10, 2015.
Non-Final Office Action from U.S. Appl. No. 14/735,886, dated Sep. 22, 2016.
Non-Final Office Action from U.S. Appl. No. 14/735,886, dated Apr. 19, 2017.
Azagury et al., "Point-in-Time Copy: Yesterday, Today and Tomorrow," IEEE/NASA Conf. Mass Storage Systems, 2002, pp. 259-270, Retrieved From http://storageconference.us/2002/papers/d05bp-aaz.pdf.
Sipka et al., U.S. Appl. No. 15/670,674, filed Aug. 7, 2017.
Sipka et al., U.S. Appl. No. 15/804,994, filed Nov. 6, 2017.
Hitachi, "Hitachi ShadowImage Replication Software for Hitachi Storage," Datasheet, Jun. 2015, 2 pages, retrieved from https://www.hds.com/en-us/pdf/datasheet/hitachi-datasheet-shadowimage-heterogeneous-replication-software.pdf.
Restriction Requirement from U.S. Appl. No. 15/670,674, dated Jan. 11, 2019.
Non-Final Office Action from U.S. Appl. No. 15/670,674, dated Apr. 5, 2019.
Notice of Allowance from U.S. Appl. No. 15/670,674, dated Oct. 24, 2019.
Notice of Allowance from U.S. Appl. No. 16/735,347, dated Jan. 4, 2021.

* cited by examiner

POINT-IN-TIME COPY ON A REMOTE SYSTEM

BACKGROUND

The present invention relates to disaster recovery systems, and more specifically, this invention relates to creating point-in-time copies on remote systems.

Data replication may be implemented for a number of different reasons, which includes data retention. Accordingly, data may be replicated between two systems which may be connected together in order to facilitate the replication of a data volume from system A to system B. However, when a replica is created on a remote system, the process experiences a time delay during which an initial synchronization is performed.

For instance, when a storage system replicates a volume to a remote system, such as a disaster recovery (DR) location, the initial replication can take a significant amount of time. There is often a requirement to mount the volumes at the DR location on a server system, which may only happen once the initial replication has completed. As a result, the total time that passes before having the volumes successfully mounted is undesirably long.

Moreover, conventional products experience additional drawbacks while attempting to create a point-in-time copy of a volume on a remote system. Some conventional products attempt to take a point-in-time copy of a volume on a source system and then perform a synchronous or asynchronous replication of that point-in-time copy to a remote system. However, the complete point-in-time copy is required on the remote system before any of the data included therein may be read. Moreover, an undesirably high amount of the source system's storage is required to perform this replication, as a copy of the point-in-time copy is also stored at the source system. Other conventional products attempt to replicate the volume itself to the remote system, and thereafter take a point-in-time copy of the volume. However, the complete point-in-time copy is again required on the remote system before any of the data included therein may be read, in addition to using an undesirably large amount of the remote system's storage.

It follows that an improved process of creating point-in-time copies of volumes on remote systems is desired.

SUMMARY

A computer-implemented method, according to one embodiment, includes: receiving existing data at a secondary storage volume in a secondary system from a primary storage volume in a primary system. The existing data received by the secondary storage volume is a point-in-time copy of the primary storage volume. A secondary record which corresponds to regions in the secondary storage volume is also maintained by indicating which of the regions in the secondary storage volume have been written to. Moreover, in response to receiving a write request at the secondary system: a determination is made as to whether data corresponding to at least a portion of the write request will fully overwrite one or more of the regions in the secondary storage volume. The at least a portion of the write request is performed in response to determining that the data corresponding to the at least a portion of the write request will fully overwrite one or more of the regions in the secondary storage volume. However, a request is sent to the primary system for existing data corresponding to a portion of one or more respective regions in the secondary storage volume in response to determining that the data corresponding to at least a portion of the write request will not overwrite a portion of the one or more respective regions in the secondary storage volume. The requested existing data is received from the primary system, and merged with the data corresponding to the at least a portion of the write request determined will not overwrite the portion of the one or more respective regions in the secondary storage volume. The merged data is further written to the one or more respective regions in the secondary storage volume, and the secondary record is updated. A message is also sent to the primary system indicating the update to the secondary record, the message being for updating a primary record which indicates which portions of the point-in-time copy of the primary storage volume have been implemented in the secondary storage volume.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic that is integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
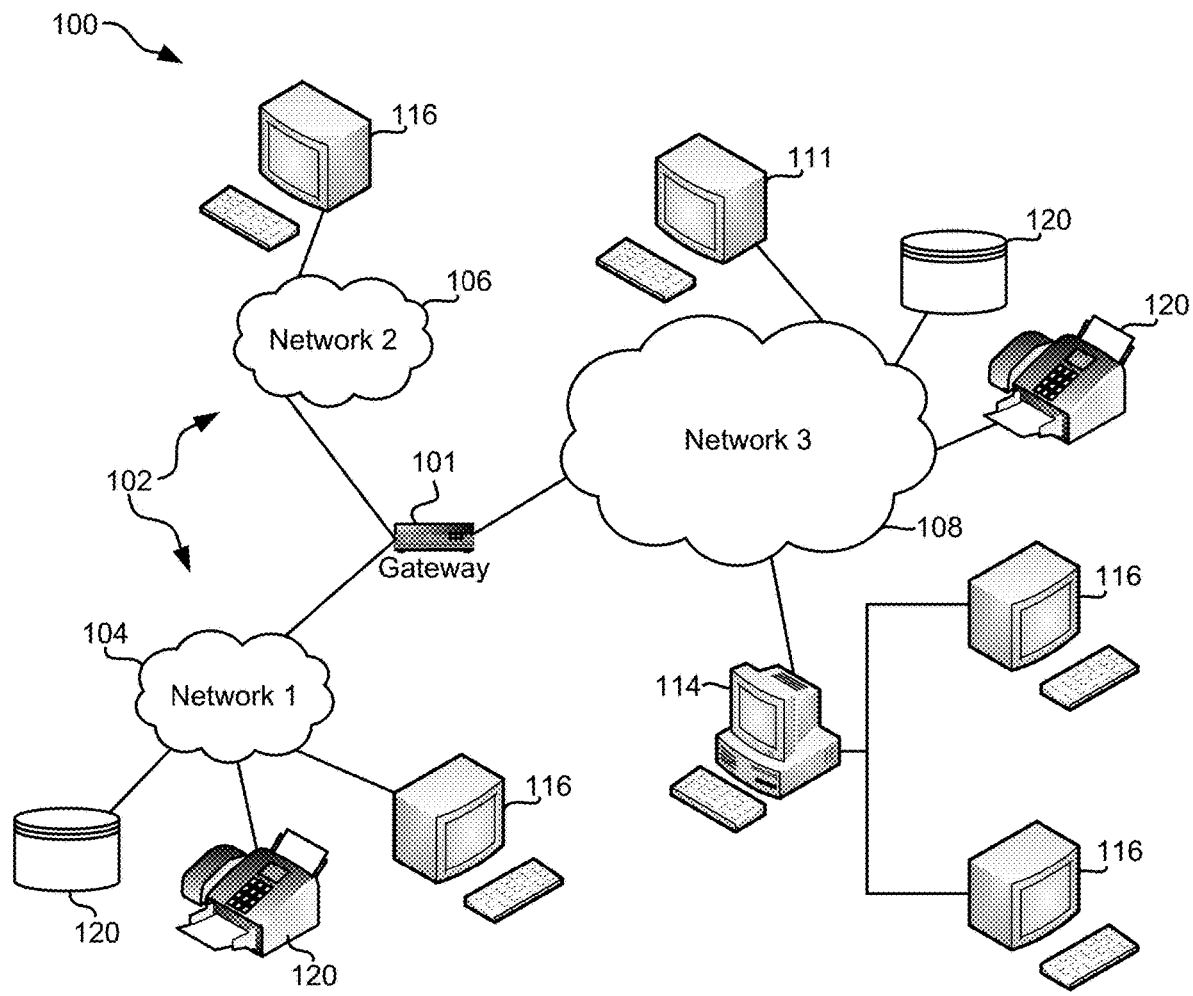
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the"

include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for creating instantly-available point-in-time data replication on remote systems. It should be noted that "instantly-available" is intended to mean that read and write requests may be performed even during the synchronization process of creating the point-in-time copy of the volume. In other words, upon initiating some of the processes described herein, a point-in-time copy of a data volume at a remote location (relative to the source copy of the volume) may be read from and/or written to directly upon request.

In one general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, data at a secondary storage volume in a secondary system from a primary storage volume in a primary system; and maintaining, by the processor, a secondary record which corresponds to regions in the secondary storage volume. Maintaining the secondary record includes indicating which of the regions in the secondary storage volume contain a portion of the received data. Moreover, in response to receiving a read request at the secondary system, the method includes: determining, by the processor, whether data corresponding to the read request is in one or more of the regions in the secondary storage volume; reading, by the processor, at least a portion of the data corresponding to the read request from the secondary storage volume in response to determining that at least a portion of the data corresponding to the read request is in one or more of the regions in the secondary storage volume; sending, by the processor, a request to the primary system for at least a portion of the data corresponding to the read request in response to determining that at least a portion of the data corresponding to the read request is not in any of the regions in the secondary storage volume; receiving, by the processor, the at least a portion of the data corresponding to the read request from the primary system; supplying, by the processor, all the data corresponding to the read request; storing, by the processor, the at least a portion of the data corresponding to the read request received from the primary system in one or more regions in the secondary storage volume; updating, by the processor, the secondary record to indicate that the one or more regions in the secondary storage volume in which the data was stored contain the at least a portion of the data corresponding to the read request received from the primary system; and sending, by the processor, a message to the primary system indicating that the one or more regions in the secondary storage volume in which the data was stored contain the at least a portion of the data corresponding to the read request received from the primary system. The data received by the secondary storage volume is a point-in-time copy of the primary storage volume. Accordingly, the message sent to the primary system is for updating a primary record that indicates which portions of the point-in-time copy of the primary storage volume have been received by the secondary system.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: sending, by the processor, existing data to a secondary storage volume in a secondary system from a primary storage volume in a primary system; and maintaining, by the processor, a primary record which corresponds to regions in the primary storage volume. Maintaining the primary record includes indicating which of the regions in the primary storage volume contain existing data that has already been sent to the secondary storage volume. The existing data sent to the secondary storage volume is a point-in-time copy of the primary storage volume. Moreover, in response to receiving a write request at the primary system, the method includes: determining, by the processor, whether existing data corresponding to the write request has already been copied to the secondary storage volume; performing, by the processor, the write request at the primary system in response to determining that all the existing data corresponding to the write request has already been copied to the secondary storage volume; reading, by the processor, at least a portion of the existing data corresponding to the write request from the primary storage volume in response to determining that at least a portion of the existing data corresponding to the write request has not already been sent to the secondary storage volume; sending, by the processor, the at least a portion of the existing data corresponding to the write request to the secondary system; receiving, by the processor, an indication from the secondary system that the at least a portion of the existing data corresponding to the write request has been stored in the secondary storage volume and that a secondary record corresponding to regions in the secondary storage volume has been updated accordingly; updating, by the processor, the primary record in response to receiving the indication; and performing, by the processor, the write request.

In yet another general embodiment, a computer program product includes a computer readable storage medium having program instructions embodied therewith. The computer readable storage medium is not a transitory signal per se. Moreover, the program instructions readable and/or executable by a processor to cause the processor to perform a method which includes: receiving, by the processor, existing data at a secondary storage volume in a secondary system from a primary storage volume in a primary system; and maintaining, by the processor, a secondary record which corresponds to regions in the secondary storage volume. Maintaining the secondary record includes indicating which of the regions in the secondary storage volume have been written to. Moreover, the existing data received by the secondary storage volume is a point-in-time copy of the primary storage volume. In response to receiving a write request at the secondary system, the method includes: determining, by the processor, whether data corresponding to at least a portion of the write request will fully overwrite one or more of the regions in the secondary storage volume; performing, by the processor, the at least a portion of the write request in response to determining that the data corresponding to the at least a portion of the write request will fully overwrite one or more of the regions in the secondary storage volume; sending, by the processor, a request to the primary system for existing data corresponding to a portion of one or more respective regions in the secondary storage volume in response to determining that the data corresponding to at least a portion of the write request will not overwrite a portion of the one or more respective regions in the secondary storage volume; receiving, by the processor, the requested existing data from the primary system; merging, by the processor, the requested existing data with the data corresponding to the at least a portion of the write request determined will not overwrite the portion of the one or more respective regions in the secondary storage volume; writing, by the processor, the merged data to the one or more respective regions in the secondary storage volume; updating, by the processor, the secondary record; and sending, by the processor, a message to the primary system indicating the update to the secondary record, the message being for updating a primary record which indicates which portions of the point-in-time copy of the primary storage volume have been implemented in the secondary storage volume.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
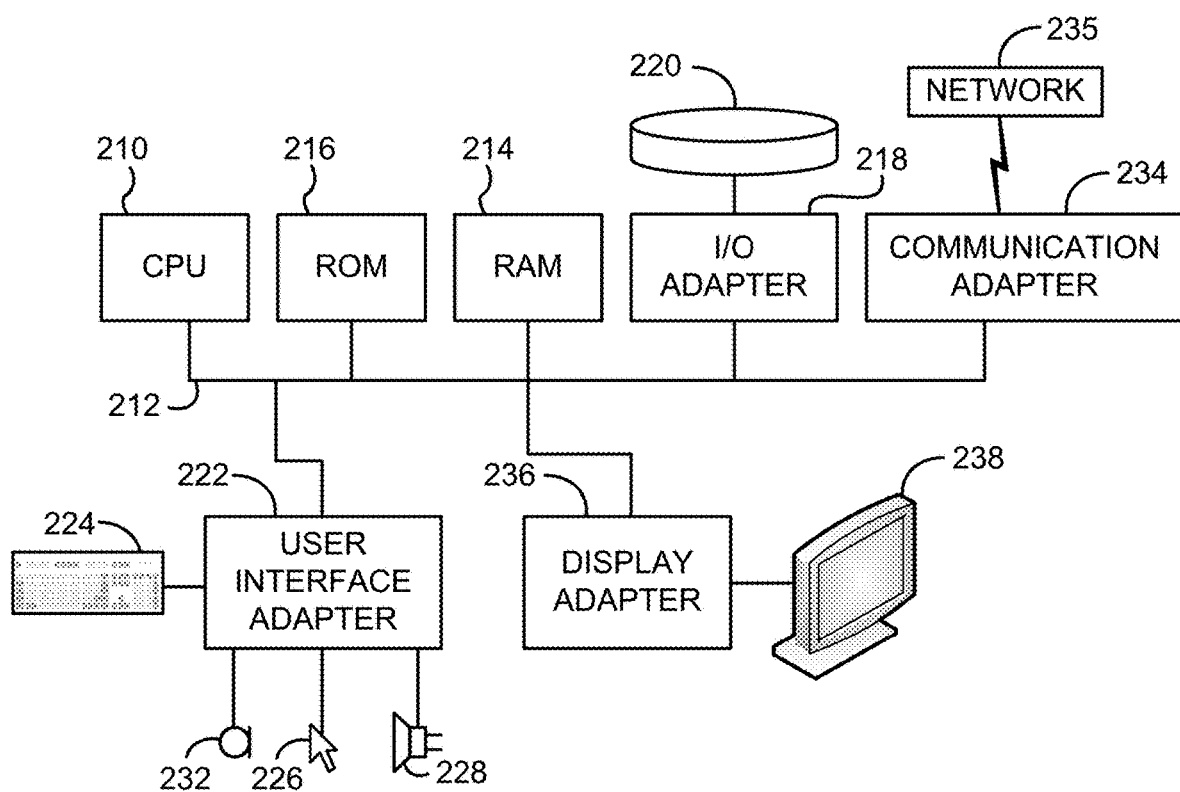
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
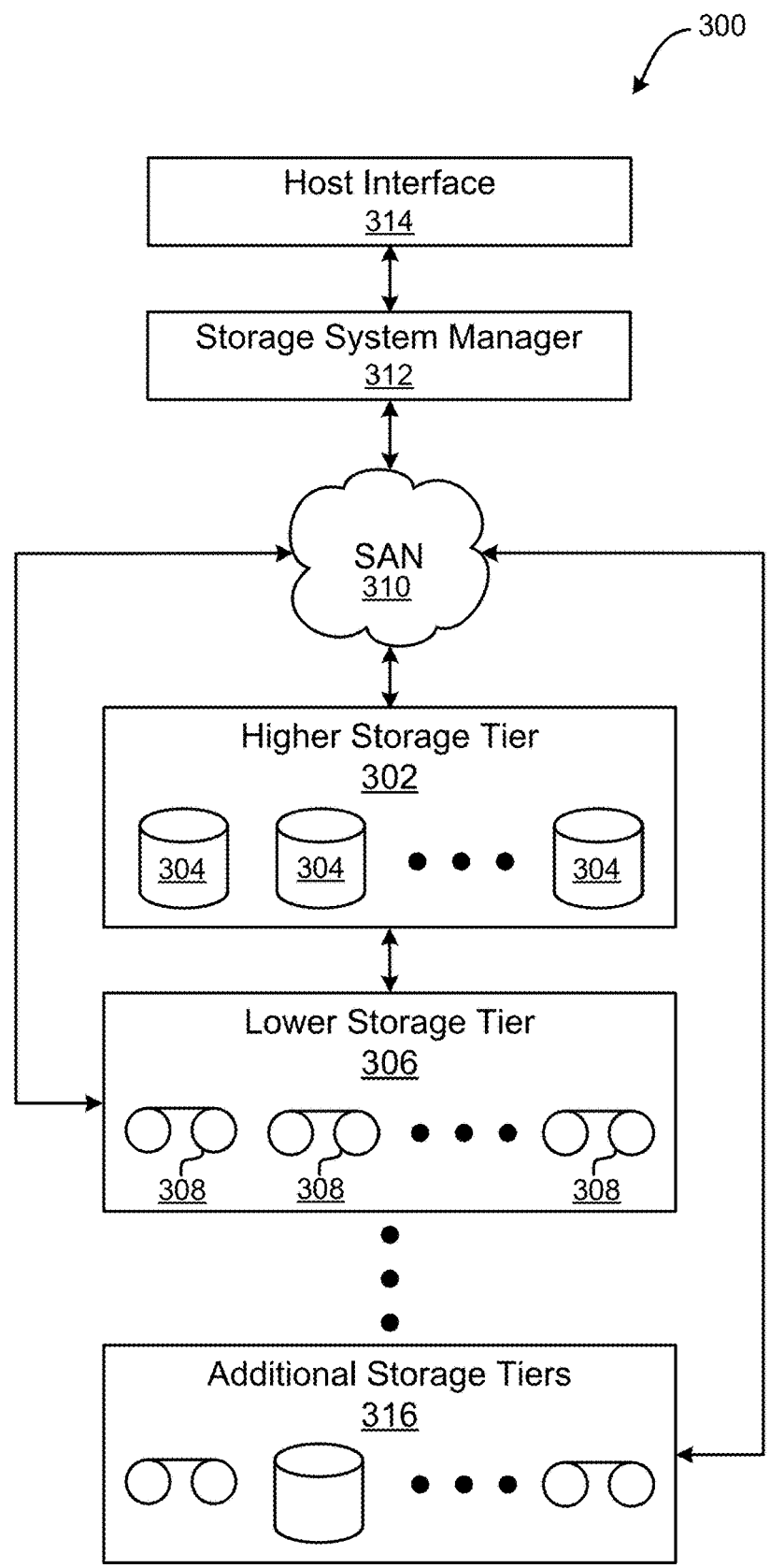
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, conventional products experience significant drawbacks involved with attempting to create a point-in-time copy of a volume on a remote system. Some conventional products attempt to take a point-in-time copy of a volume on a source system and then perform a synchronous or asynchronous replication of that point-in-time copy to a remote system. However, the complete point-in-time copy is required on the remote system before any of the data included therein may be read or written to. Moreover, an undesirably high amount of the source system's storage is required to perform this replication, because a copy of the point-in-time copy is also stored at the source system. Other conventional products attempt to replicate the volume itself to the remote system, and thereafter take a point-in-time copy of the volume. However, the complete point-in-time copy is again required on the remote system before any of the data included therein may be read or written to, in addition to using an undesirably large amount of the remote system's storage to store both the replicated volume and point-in-time copy.

In sharp contrast, various embodiments described herein may be able to achieve an improved process of creating instantly available point-in-time copies of volumes, the point-in-time copies being created on remote systems, e.g., as will be described in further detail below.

The ability to efficiently create point-in-time copies on remote systems is desirable for various reasons, including, but not limited to, being able to perform data analytics on host systems remote from the production location, storing backups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Moreover, being able to use the point-in-time copy before initial synchronization (which could take days) makes the system much more responsive to business requirements than conventional products.

Figure 4:
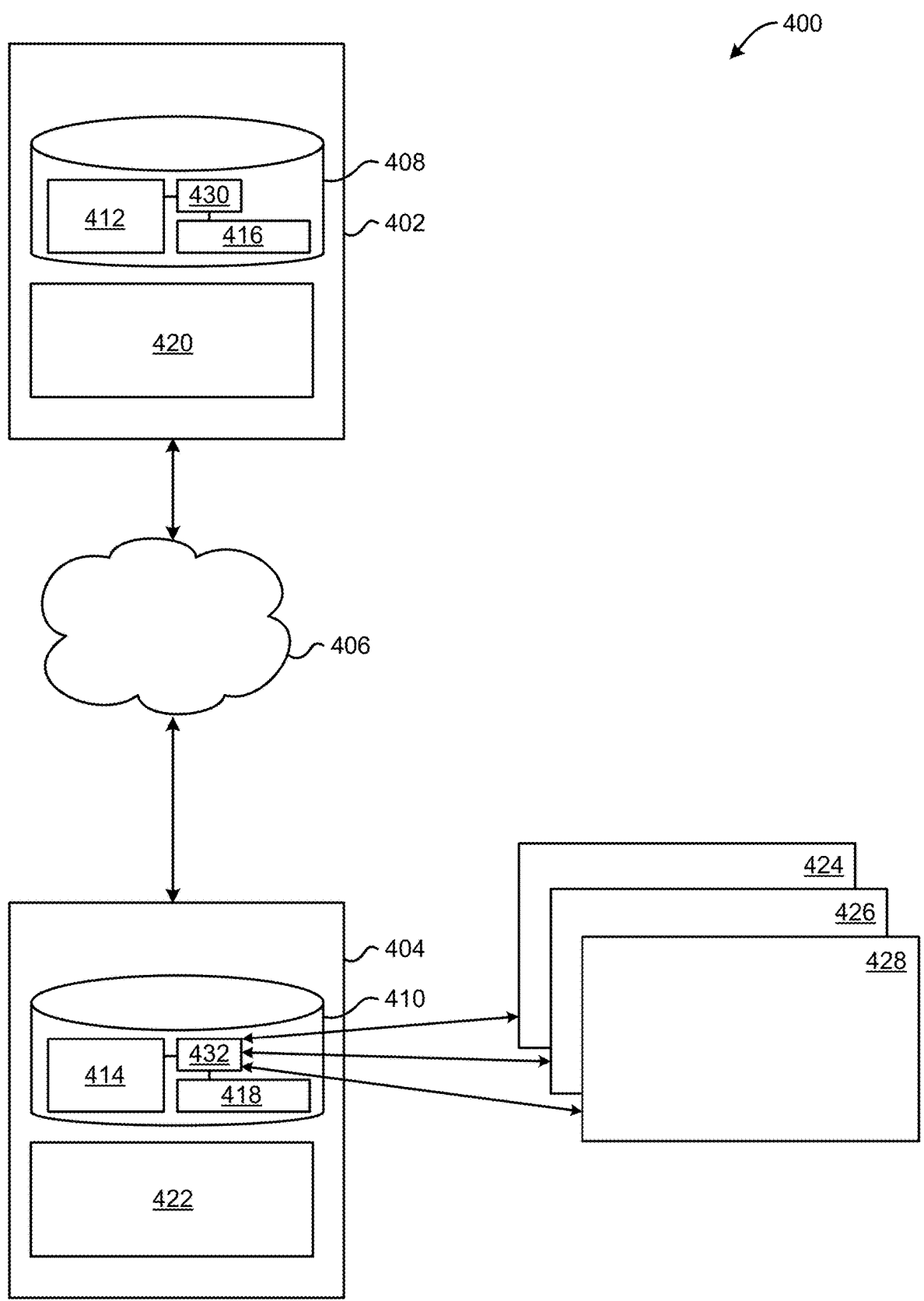
FIG. 4 is a partial representative view of a storage system in accordance with one embodiment.

Looking now to FIG. 4, a partial representative view of an overarching storage system 400 is illustrated in accordance with one embodiment. As an option, the present storage system 400 may be implemented in conjunction with features from any other embodiment listed herein, such as those described with reference to the other FIGS. However, such storage system 400 and others presented herein may be used in various applications and/or in permutations which may or may not be specifically described in the illustrative embodiments listed herein. Further, the storage system 400 presented herein may be used in any desired environment. Thus FIG. 4 (and the other FIGS.) may be deemed to include any possible permutation.

As shown, the storage system 400 includes a primary system 402 and a secondary system 404. Here, the primary and secondary systems 402, 404 are remote from each other, meaning that the two systems are sufficiently separated. According to different approaches, the primary and secondary systems 402, 404 may be located at two different geographical locations, physically isolated from each other (e.g., not having any shared hardwiring) in a same overarching system, subjected to different administrative management schemes, etc. However, the primary system 402 and a secondary system 404 are coupled to each other (e.g., wirelessly connected) via a network 406, which may take any form including, but not limited to, a LAN, a WAN (e.g., such as the Internet), PSTN, internal telephone network, etc. Moreover, each of the primary system 402 and the secondary system 404 may be connected to the network 406 itself wirelessly and/or via a wired connection, e.g., depending on system parameters. Accordingly, the primary and secondary systems 402, 404 may transfer information (e.g., data) therebetween despite being remote from each other.

The primary and secondary systems 402, 404 each include a respective storage 408, 410. Moreover, each of the storages 408, 410 in turn include a bitmap 412, 414 and storage volume 416, 418 respectively. The primary and secondary systems 402 404 preferably use the respective bitmaps 412, 414 to maintain records of the data included in the storage volumes 416, 418. Furthermore, primary and secondary systems 402, 404 each include a respective replication component 420, 422 which may be used to execute one or more replication processes, e.g., according to any of the approaches described herein. In some approaches, the secondary system 404 may be considered a disaster recovery (DR) system which is used to store a backup copy of the data included in the storage volume 416 of the primary system 402. Accordingly, the storage volume 418 of the secondary system 404 may include a secondary copy of the data included in the storage volume 416 of the primary system 402, e.g., as will be described in further detail below. This secondary copy stored in the storage volume 418 of the secondary system 404 may be used to recover the storage volume 416 of the primary system 402 in response to experiencing a hardware failure, a software failure, unintentional deletion of data, etc., or any other reason which may cause the storage volume 416 of the primary system 402 to lose data.

The bitmaps 412, 414 correspond to regions of the respective storage volumes 416, 418 and may therefore be used to record the synchronisation of a replication process. According to an exemplary approach, the primary bitmap 412 may set the bits included therein to record (indicate) that certain portions of data included in the primary storage volume 416 have been sent to the secondary storage volume 418. Moreover, the secondary bitmap 414 may set bits which correspond to regions in the secondary storage volume 418 which have received an up-to-date copy of the data included in the primary storage volume 416. The bits included in each of the bitmaps may also be used to handle read and/or write requests received by either of the primary and/or secondary systems 402, 404, e.g., as will be described in further detail below.

Requests to access (e.g., read and/or write to) the replicated data may be processed by a controller 432 which is coupled to the secondary storage volume 418 and bitmap 414 of the secondary system 404. Thus, one or more host servers 424, 426, 428 may send access requests to the controller 423 as illustrated in FIG. 4. Moreover, requests to access the data included in the storage volume 416 of the primary system 402 may be processed by a controller 430 coupled to the primary storage volume 416 and bitmap 412 of the primary system 402. However, the manner in which received read and/or write requests are performed may vary depending on where the request is received, the status of an active storage volume replication process, user preference, etc.

Figure 5:
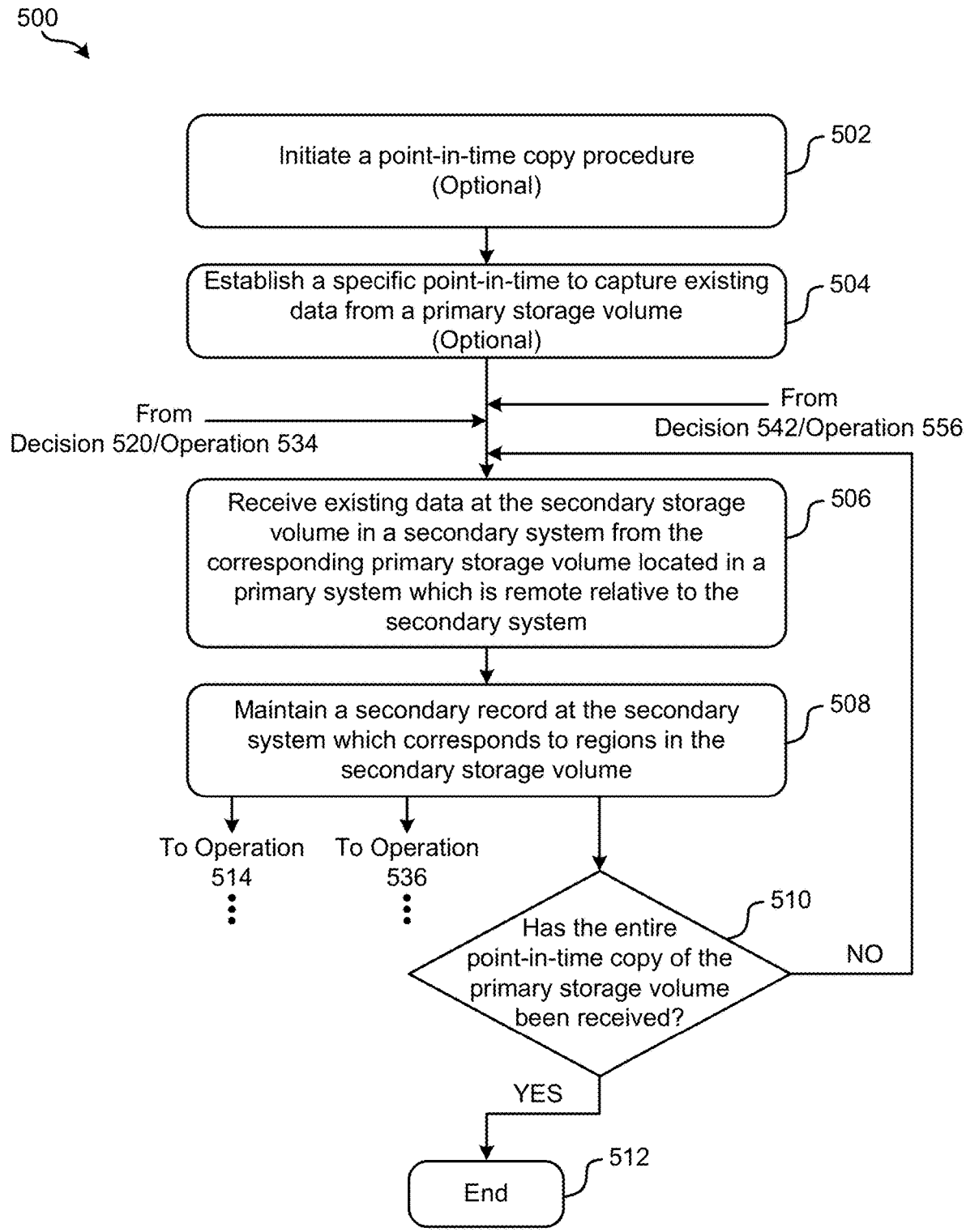
FIG. 5 is a flowchart of a method in accordance with one embodiment.
Figure 5:
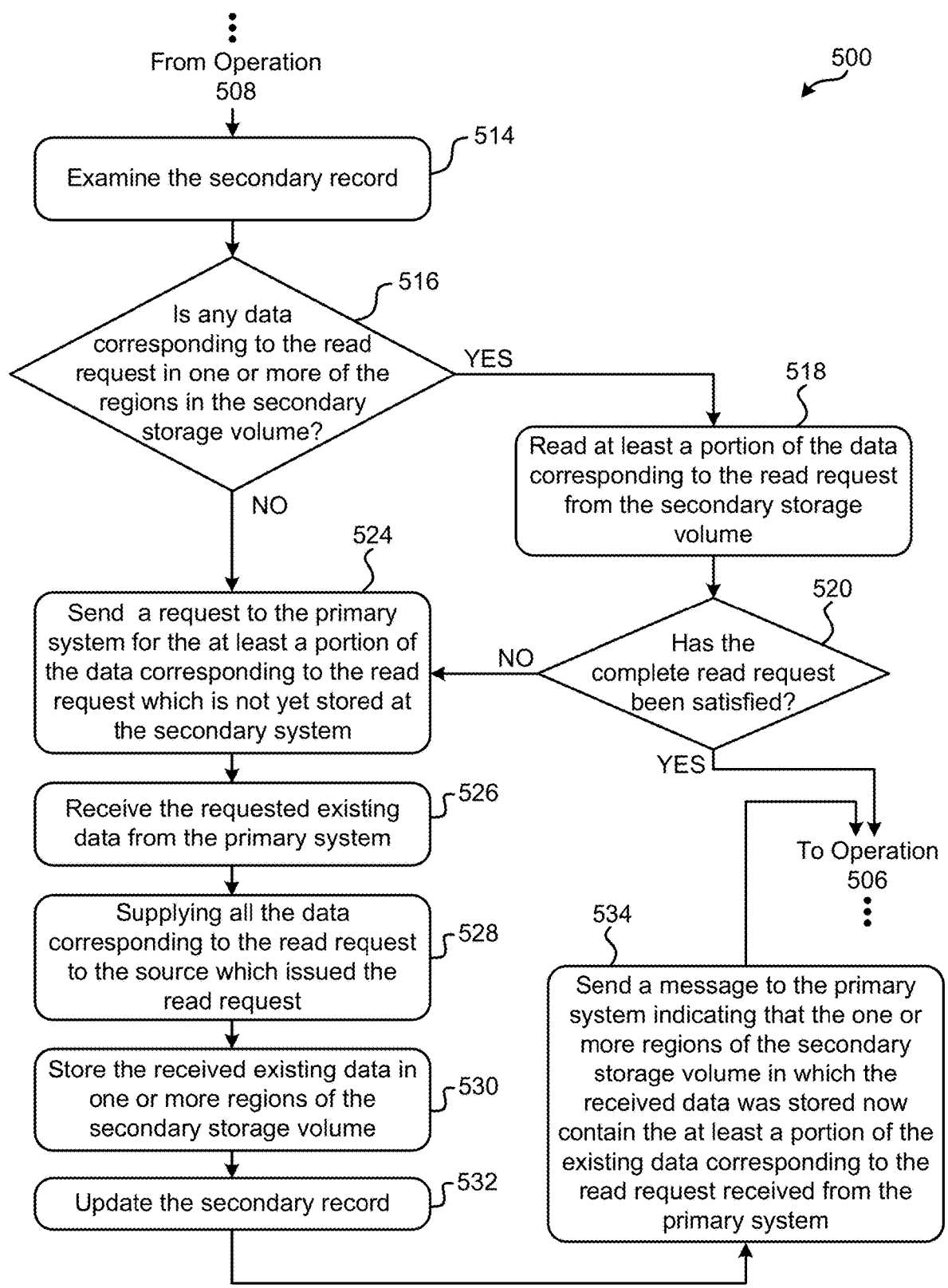
Figure 5:
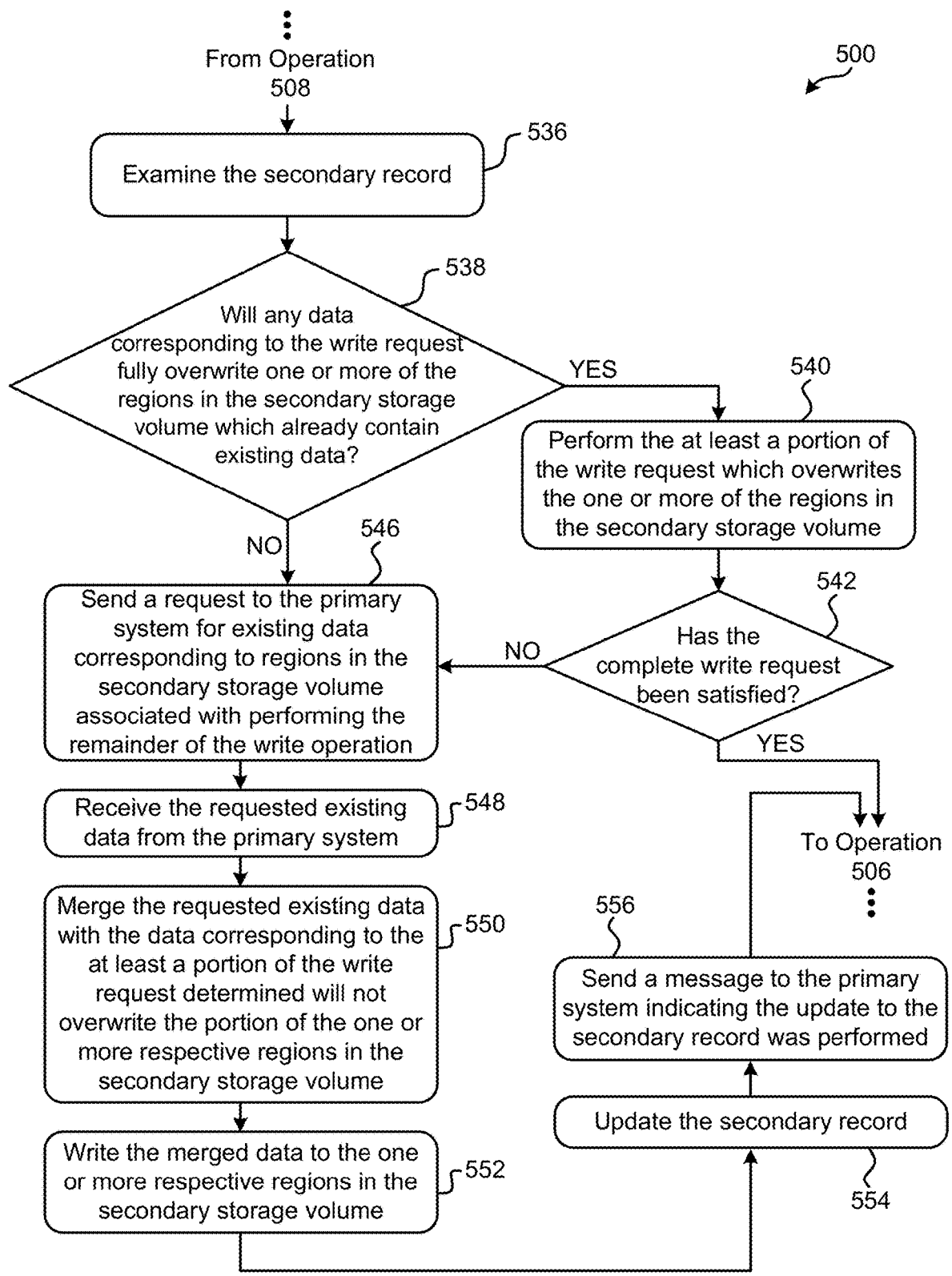

Looking to FIG. 5, a flowchart of a computer-implemented method 500 for creating a copy of a data storage volume on a remote system is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, optional operation 502 of method 500 includes initiating a point-in-time copy procedure. As mentioned above, the ability to efficiently create point-in-time copies on remote systems is desirable for various reasons such as, being able to perform data analytics on host systems remote from the production location, storing backups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Accordingly, a point-in-time copy procedure may be initiated in response to a user request, a predetermined condition being met, etc.

Moreover, optional operation 504 includes establishing a specific point-in-time to capture existing data from a primary storage volume (a source volume) in response to the point-in-time copy procedure being initiated. The established point-in-time serves as a reference point at which data existing in the primary storage volume is captured and copied onto a secondary backup volume. Establishing the reference point-in-time is particularly desirable in distributed systems where each node of the system preferably agrees what writes form part of the point-in-time copy. According to various approaches, any manner of establishing a specific point-in-time which would be apparent to one skilled in the art after reading the present description may be employed. Moreover, once a specific point-in-time has been established, the steady state of the remote point-in-time copy system will be to copy uncopied regions of the primary storage volume to the secondary volume, e.g., as a part of a "background copy" process.

Operation 506 further includes receiving existing data at the secondary storage volume in a secondary system from the corresponding primary storage volume located in a primary system which is remote relative to the secondary system. As mentioned above, the existing data received at the secondary storage volume may be a point-in-time copy of the data existing in the primary storage volume. Accordingly, the data received may correspond to data existing in the primary storage volume as it were at an established point-in-time. The secondary storage volume may serve as a DR copy of the existing data in some approaches, e.g., should the primary volume be lost due to corruption, unintentional deletion, system failure, etc. It should be noted that "existing data" as used herein is intended to refer to the data included in the primary storage volume which is being replicated onto the secondary storage volume. Thus, according to an exemplary approach, "existing data" may be the data included in a point-in-time copy of the primary storage volume being replicated onto the secondary storage volume.

It is preferred that as the existing data is being received at the secondary storage volume from the primary storage volume, the secondary storage volume is made available for read and/or write access before the entire point-in-time copy of the primary storage volume has been copied to the secondary storage volume. Thus, read and/or write requests received at the secondary system may be performed during the replication process. Moreover, it should be noted that the "replication process" as used herein refers to the process of forming a copy of a primary storage volume on a remote system.

In order to achieve read and/or write functionality at the secondary storage volume during the replication process, operation 508 includes maintaining a secondary record at the secondary system which corresponds to regions in the secondary storage volume. According to an illustrative approach, the secondary record may be a bitmap (e.g., see 414 of FIG. 4). Each bit of the bitmap may correspond to a respective region in the secondary storage volume on which the existing data received in operation 506 is stored. Accordingly, in preferred approaches, maintaining the secondary record includes indicating which of the regions in the secondary storage volume contain a portion of the received existing data. In other words, maintaining the secondary record preferably includes indicating which of the regions in the secondary storage volume have been written to. Moreover, a "region" is a fixed-size quantity of the given volume. In other words, each region in a given volume is preferably the same size. However, different volumes may implement different sized regions, e.g., depending on the desired approach.

In approaches where the secondary record is a bitmap, setting a bit to have a logical value of "1" may indicate that the corresponding region of the secondary storage volume contains an appropriate portion of the received existing data, while setting a bit to have a logical value of "0" may indicate that the corresponding region of the secondary storage volume does not yet contain any data. Thus the background copy process will gradually set the bits of both bitmaps as the primary storage volume is copied to the secondary system. However, any other desired method of indicating whether a given region in the secondary storage volume contains an appropriate portion of existing data may be implemented. It follows that the secondary record indicated which regions of the primary storage volume have been copied to the secondary storage volume in the secondary system.

Moreover, as the primary and secondary records (particularly the secondary record) contain information which is important in ensuring a complete copy of the primary storage volume is formed in the secondary system, it is desirable that the primary and secondary records are managed in an appropriately resilient manner. According to an illustrative approach, the primary and/or secondary records may be maintained on a clustered system, preferably such that each of the bitmaps are stored on two or more different nodes in the respective clustered system. Moreover, it is preferred that each copy of the primary and secondary records is modified before any action is taken based on changing the bitmap state. In other words, it is preferred that the primary and secondary records are matched before any read and/or write operations are performed on either of the storage volumes. However, in other approaches, a storage system may implement other solutions for ensuring appropriately resilient data, e.g., such as storing the primary and/or secondary records as multiple on-disk copies.

For embodiments which include clustered systems, it is desirable that a single node is responsible for receiving and/or transmitting requests for a given storage volume at any given time. In other words, if the primary and/or secondary systems are implemented as clustered systems, it is desirable that a single node on the primary system is used to receive/send write and/or read requests corresponding to the primary storage volume, while a single node on the secondary system is used to receive/send write and/or read requests corresponding to the secondary storage volume. This permits the systems to ensure that only one data transfer request is sent (e.g., see operation 524 below) for each region. Those skilled in the art will appreciate after reading the present description that the use of a single node for transmitting requests simplifies implementation of this invention. Moreover, the responsibility of receiving and/or sending write and/or read requests may be dynamically moved between nodes of the clustered system, e.g., to avoid creating a single point of failure.

Existing data may continue to be received at the secondary storage volume from the corresponding primary storage volume until the entire point-in-time copy of the primary storage volume has been received. Accordingly, decision 510 includes determining whether the entire point-in-time copy of the primary storage volume has been received. The outcome of decision 510 may be determined a number of different ways depending on the approach. For instance, in some approaches the secondary system may receive a notification from the primary system that the entire point-in-time copy of the primary storage volume has been sent to the secondary storage volume. In other approaches, the secondary system may deduce that the entire point-in-time copy of the primary storage volume has been received at the secondary storage volume once all the bits in a bitmap associated with the secondary storage volume have been set to indicate each of the regions in the secondary storage volume contain an appropriate portion of the point-in-time copy of the primary storage volume.

It is desirable that all data corresponding to the point-in-time copy of the primary storage volume is replicated in the secondary storage volume such that the primary storage volume may be reconstructed as needed. This copy stored in the secondary storage volume of the secondary system may be used to recover the primary storage volume of the primary system in response to experiencing a hardware failure, a software failure, unintentional deletion of data, etc., or any other reason which may cause the primary storage volume to lose the data previously stored therein.

As shown, method 500 returns to operation 506 in response to determining that the entire point-in-time copy of the primary storage volume has not yet been received, whereby additional existing data may be received from the primary storage volume located in a primary system. However, method 500 may alternatively proceed to operation 512 and subsequently end in response to determining that the entire point-in-time copy of the primary storage volume has been received at the secondary system. This may be reflected in the primary and secondary records, where the primary record will indicate that data from all regions in the primary storage volume has been sent to the secondary storage volume, and the secondary record will indicate that all regions in the secondary storage volume contain data received from the primary system. However, it should be noted that in various approaches, method 500 may return to operation 502 and re-initiate a point-in-time copy procedure, e.g., in response to being prompted with a data transmission request from a separate storage system, a user input, a predetermined condition being met, etc.

Read and/or write requests may be received at the secondary system before the entire point-in-time copy of the primary storage volume has been received. Accordingly, the flowchart of method 500 may proceed to operation 514 and/or 536 depending on whether a read request and/or a write request is received before the entire point-in-time copy of the primary storage volume has been received. The flowchart of FIG. 5 has thereby been separated into three different paths which stem from operation 508. Thus, depending on the given situation, method 500 may proceed differently from operation 508, e.g., as will be described in further detail below.

Again, read requests may be received while existing data is being received at the secondary system from a remote (at least relative to the secondary system) primary system. In response to receiving such a read request for data at the secondary system, method 500 preferably proceeds to operation 514. There, operation 514 includes examining the secondary record (e.g., bitmap) to determine whether a portion of the data corresponding to the read request has been received and stored in the secondary storage volume. For approaches in which the secondary record is a bitmap, operation 514 may include examining the bitmap to determine whether one or more of the bits corresponding to the regions associated with the received read request are set indicating that there is valid data stored in the respective region(s). Moreover, decision 516 includes determining whether any data corresponding to the read request is in one or more of the regions in the secondary storage volume.

In some approaches, determining whether any data corresponding to the read request is in one or more of the regions in the secondary storage volume may include sending a request to a production system for the range of logical block addresses (LBAs) which are addressed by the received read request. Moreover, the LBAs may further be used according to any desired approach which would be apparent to one skilled in the art after reading the present description.

With continued reference to FIG. 5, method 500 proceeds to operation 518 in response to determining that the at least a portion of the data corresponding to the read request is in one or more of the regions in the secondary storage volume. As shown, operation 518 includes reading at least a portion of the data corresponding to the read request from the secondary storage volume. As existing data is received from the primary storage volume, it is stored in appropriate regions in the secondary storage volume, preferably such that the secondary storage volume eventually includes a replica of the existing data stored in the primary storage volume. In other words, the data stored in a given region of the secondary system preferably contains the same data which exists (e.g., is stored) in a corresponding region of the primary system, thereby increasing the ease by which the secondary system may assume the primary system's storage responsibilities in the event that the primary system goes offline, e.g., due to a crash, scheduled maintenance, system timeout(s), etc.

However, in some instances not all of the data corresponding to the read request may be stored in the secondary system. For instance, depending on the size of a received read request, the data corresponding to the request may be stored in one or more regions of the secondary storage volume. Moreover, regions on the secondary storage volume may be filled as the data corresponding thereto is received. Thus, all, part, or none of the data corresponding to a received read request may be stored in one or more of the regions at a given point in time. According to an example, which is in no way intended to limit the invention, a read request received by the secondary system may correspond to a given amount of data "X". However, at the point in time the read request is received, only a portion "X-Y" of the full amount of data may be stored at the secondary storage volume. Thus, the portion of data "X-Y" which corresponds to the read request and which is stored in the regions of the secondary storage volume may be read, but the remaining portion of the data "Y" not yet stored in the regions of the secondary storage volume cannot be read (accessed) from the secondary system as it has not been received yet from the primary system.

It follows that method 500 includes determining whether the complete read request has been satisfied. See decision 520. As mentioned above, in some instances although it is determined that a portion of the data corresponding to the read request is stored in regions of the secondary storage volume, a remainder of the data corresponding to the read request may not yet have been copied thereto. Accordingly, in response to determining that the complete read request has been satisfied, method 500 returns to operation 506 whereby additional existing data may be received from the primary storage volume. Moreover, any of the other processes included in method 500 may be repeated as additional existing data, write requests, read requests, etc. are received at the secondary system.

Referring again to decision 520, method 500 proceeds to operation 524 in response to determining that the complete read request has not yet been satisfied. There, operation 524 includes sending a request to the primary system for the at least a portion of the data corresponding to the read request which is not yet stored at the secondary system. As shown, method 500 may also progress to operation 524 from decision 516 in some approaches. Returning to decision 516, method 500 may progress to operation 524 in response to determining that the data corresponding to the read request is not in any of the regions in the secondary storage volume. It follows that operation 524 may be performed in order to request any data needed in order to complete the received read request. According to an exemplary approach, the request sent to the primary system in operation 524 may request the range of LBAs addressed by the read request, expanded outwards at the start and/or end of the read request such that the request covers an integer number of regions.

Moreover, operation 526 includes receiving the requested existing data from the primary system. Depending on how much of the data corresponding to the read request was already stored in the regions of the secondary storage volume, the existing data received in operation 526 may only be a portion, a majority, all, etc., of the data corresponding to the read request. Once received, all the data corresponding to the read request is supplied to the source (e.g., whoever and/or whatever) which issued the read request received at the secondary system. See operation 528. Accordingly, the existing data received may be grouped together with data corresponding to the read request which was already stored in regions of the secondary storage volume in instances where only a portion of the data corresponding to the read request was requested from the primary system. Depending on the approach, the data corresponding to the read request may be supplied to one or more locations depending on the read request originally received. Moreover, the data may be supplied in any desired format.

Method 500 further includes storing the existing data received in operation 526 in one or more regions of the secondary storage volume. See operation 530. Thus, at least a portion of the data corresponding to the read request may be added to the one or more regions in the secondary storage volume. The data is preferably added to the appropriate regions of the secondary storage volume such that each region in the secondary storage volume contains the same portion of data as a corresponding region in the primary storage volume. However, it should be noted that the data may be stored in any desired manner depending on the desired approach.

Moreover, operation 532 includes updating the secondary record to indicate that the one or more regions in the secondary storage volume in which the received data was stored contain the at least a portion of the existing data corresponding to the read request received from the primary system. In other words, operation 532 includes updating the secondary record to indicate that the data received in operation 526 has been added to the appropriate regions of the secondary storage volume. As previously mentioned, the secondary storage volume may be a bitmap in some approaches. In such approaches, operation 532 may include setting each of the bits in the bitmap which correspond to regions which the data was added to in operation 526, where each of the bits are set to indicate that a respective region includes an appropriate portion of existing data received from the primary storage volume.

Furthermore, operation 534 includes sending a message to the primary system indicating that the one or more regions of the secondary storage volume in which the received data was stored now contain the at least a portion of the existing data corresponding to the read request received from the primary system. Sending this message allows for the primary system to be informed of any updates which have occurred to the regions of the secondary storage volume and/or the secondary record itself. Thus, the message sent in operation 534 may effectively be for updating a primary record that indicates which portions of the point-in-time copy of the primary storage volume have been received by the secondary system. As a result, the primary record and the secondary record may maintain a matching record of which portions of the primary storage volume have been replicated in the secondary storage volume. Maintaining matching (e.g., equivalent) primary and secondary records allows for the primary and secondary systems to ensure that the replication process creates a full version of the point-in-time copy in the secondary storage volume, thereby avoiding data loss, data corruption, etc., as will be described in further detail below.

Thereafter, method 500 returns to operation 506 whereby additional existing data may be received from the primary storage volume. Moreover, any of the other processes included in method 500 may be repeated as additional existing data, write requests, read requests, etc. are received at the secondary system.

However, it should be noted that if multiple read requests are received in quick succession at the secondary system, each of which correspond to a same region, the read requests received after a first read request for the region are preferably postponed. The secondary system is preferably able to detect that there is an outstanding (ongoing) read request corresponding to the given region in the secondary storage volume, and therefore the performance of subsequent read requests to that same region may be postponed until the data corresponding to the outstanding request is retrieved. By postponing subsequently received read requests which correspond to a same region as an outstanding read request, more than one read request may be satisfied with the data that is retrieved. In other words, if the secondary system is already in the process of receiving or at least requesting data from that region in the primary system, that data may be used to perform more than one read request rather than sending multiple requests to the primary system which correspond to the same data. Likewise, if the secondary system has a read request outstanding while receiving data from a same region of the primary storage volume for a different reason not related to the read request, the secondary system may act as though the data being received is in response to issuing a retrieval request corresponding to the outstanding read request. Accordingly, once the data is received at the secondary system and stored in the appropriate region(s) of the secondary storage volume, it may be used to perform the outstanding read request. By transmitting the data from the primary system to the secondary system only once, the configuration is able to avoid a more complex scheme to ensure successful data transfer and read performance, thereby ensuring efficiency.

Returning to operation 508, as mentioned above, read and/or write requests may be received at the secondary system before the entire point-in-time copy of the primary storage volume has been received. Accordingly, the flowchart of method 500 may proceed from operation 508 to operation 514 and/or 536 depending on whether a read request and/or a write request is received before the entire point-in-time copy of the primary storage volume has been received. In response to receiving write request at the secondary system corresponding to the secondary storage volume, method 500 preferably proceeds to operation 536. There, operation 536 includes examining the secondary record. As mentioned above, the secondary record may be a bitmap, the bits of which may be examined to determine whether a portion of the existing data being received from the primary storage volume which corresponding to the write request has already been received and stored in the secondary storage volume. Accordingly, decision 538 includes determining whether data corresponding to at least a portion of the write request will fully overwrite one or more of the regions in the secondary storage volume which already contain existing data.

As mentioned above, for embodiments which include clustered systems, it is desirable that a single node is responsible for receiving and/or transmitting requests for a given storage volume at any given time. In other words, if the primary and/or secondary systems are implemented as clustered systems, it is desirable that a single node on the primary system is used to receive/send write and/or read requests corresponding to the primary storage volume, while a single node on the secondary system is used to receive/send write and/or read requests corresponding to the secondary storage volume. As a result, only one read or write request may be outstanding for a given system. Otherwise, it would be possible for two nodes to attempt to write replicated data to the secondary storage volume at substantially (e.g., about) the same time, thereby potentially overwriting any host write(s) that had been applied therebetween. Moreover, the responsibility of receiving and/or sending write and/or read requests may be dynamically moved between nodes of the clustered system, e.g., to avoid creating a single point of failure.

Moreover, as described above, if multiple write requests are received in quick succession at the secondary system, each of which correspond to a same region, the write requests received after a first write request for the region are preferably postponed. The secondary system is preferably able to detect that there is an outstanding (ongoing) write request corresponding to the given region in the secondary storage volume, and therefore the performance of subsequent write requests to that same region may be postponed until the data corresponding to the outstanding request is retrieved from the primary storage volume and/or the outstanding write request itself is performed. By postponing subsequently received write requests which correspond to a same region as an outstanding write request, more than one write request may be satisfied with the data that is retrieved from the primary system and/or written to the region, thereby improving efficiency.

With continued reference to FIG. 5, method 500 proceeds to operation 540 in response to determining that the data corresponding to the at least a portion of the write request will fully overwrite one or more of the regions in the secondary storage volume. There, operation 540 includes performing the at least a portion of the write request which overwrites the one or more of the regions in the secondary storage volume.

However, in some instances not all of the data corresponding to the write request will fully overwrite regions in the secondary storage volume which already contain existing data. For instance, depending on the size of a received write request, the data corresponding to the request may be stored in one or more regions of the secondary storage volume. Moreover, regions on the secondary storage volume are filled as the data corresponding thereto is received. Thus, all, part, or none of the data which is to be affected (e.g., overwritten) by the received write request may be stored in one or more of the regions at a given point in time. According to an example, which is in no way intended to limit the invention, a write request received by the secondary system may correspond to a given amount of data "X". However, at the point in time the write request is received, only a portion "X-Y" of the full amount of data may be stored at the secondary storage volume. Thus, the portion of data "X-Y" which corresponds to the write request and which is stored in the regions of the secondary storage volume may be written, but the remaining portion of the data "Y" which corresponds to data not yet stored in the regions of the secondary storage volume is preferably not written to avoid any data discrepancies in either of the primary and/or secondary systems.

It follows that method 500 includes determining whether the complete write request has been satisfied. See decision 542. As mentioned above, in some instances although it is determined that a portion of the data corresponding to the write request is already stored in regions of the secondary storage volume, a remainder of the data corresponding to the write request may not yet have been copied thereto. Accordingly, in response to determining that the complete write request has been satisfied by operation 540, method 500 returns to operation 506 whereby additional existing data may be received from the primary storage volume. Moreover, any of the other processes included in method 500 may be repeated as additional existing data, write requests, read requests, etc. are received at the secondary system.

Referring again to decision 542, method 500 proceeds to operation 546 in response to determining that the complete write request has not yet been satisfied. In other words, method 500 may proceed to operation 546 in response to determining that the data corresponding to at least a portion of the write request will not overwrite a portion of (e.g., will only partially overwrite) the one or more respective regions in the secondary storage volume. There, operation 546 includes sending a request to the primary system for existing data corresponding to a portion of one or more respective regions in the secondary storage volume associated with performing the remainder of the write operation. As mentioned above, a portion of the write request may correspond to data which has not yet been received by the secondary storage volume from the primary storage volume. It follows that such data is preferably requested from the primary storage volume such that the complete write request may be performed. As shown, method 500 may also progress to operation 546 from decision 538 in some approaches.

Returning to decision 538, method 500 may progress to operation 546 in response to determining that none of the data corresponding to the write request will fully overwrite any of the regions in the secondary storage volume. It follows that operation 546 may be performed in order to request any data needed in order to successfully complete the received write request. Moreover, operation 548 includes receiving the requested existing data from the primary system. Depending on how much of the data corresponding to the write request was already stored in the regions of the secondary storage volume, the existing data received in operation 548 may only be a portion, a majority, all, etc., of the data corresponding to the write request.

Once received, operation 550 includes merging the requested (and received) existing data with the data corresponding to the at least a portion of the write request determined will not overwrite the portion of the one or more respective regions in the secondary storage volume. Moreover, operation 552 includes writing the merged data to the one or more respective regions in the secondary storage volume. In other words, operation 550 includes merging the requested existing data with a remainder of the write request which has not yet been performed. Accordingly, the requested existing data and the remainder of the write request may be added to the secondary storage volume in a single operation (operation 552) rather than two distinct operations, thereby desirably reducing latency, decreasing consumption of system resources, etc.

However, in other approaches the requested existing data may be written to the secondary storage volume before the remainder of the write request is performed. Thus, in approaches where a given region was only partially filled with data and therefore was not able to be written to, the received existing data may be merged with the data which was already partially filling the given region.

Furthermore, operation 554 includes updating the secondary record to indicate that each of the one or more respective regions in the secondary storage volume which have been written to now contain valid data. In other words, operation 554 includes updating the secondary record to indicate that the data received in operation 548 has been added to the appropriate regions of the secondary storage volume. As previously mentioned, the secondary storage volume may be a bitmap in some approaches. In such approaches, operation 554 may include setting each of the bits in the bitmap which correspond to regions which the data was added to in operation 548, where each of the bits are set to indicate that a respective region includes an appropriate portion of existing data received from the primary storage volume.

Furthermore, operation 556 includes sending a message to the primary system indicating the update to the secondary record was performed. In other words, operation 556 may inform the primary system that the one or more regions of the secondary storage volume in which the received data was written to now contain the at least a portion of the existing data received from the primary system, and therefore contain valid data. Sending this message allows for the primary system to be informed of any updates which have occurred to the regions of the secondary storage volume and/or the secondary record itself. Thus, the message sent in operation 556 may effectively be for updating a primary record in order to indicate which portions of the point-in-time copy of the primary storage volume have been received by, and implemented in, the secondary system. As a result, the primary record and the secondary record may maintain a matching record of which portions of the primary storage volume have been replicated in the secondary storage volume, e.g., as will be described in further detail below.

Thereafter, method 500 returns to operation 506 whereby additional existing data may be received from the primary storage volume. Moreover, any of the other processes included in method 500 may be repeated as additional existing data, write requests, read requests, etc. are received at the secondary system.

However, should the primary system go offline (e.g., due to a system failure) during the replication process described in method 500 before the whole copy of the primary volume is received by the secondary storage volume, it is preferred that appropriate action is taken to avoid data corruption and replication failure.

Figure 6:
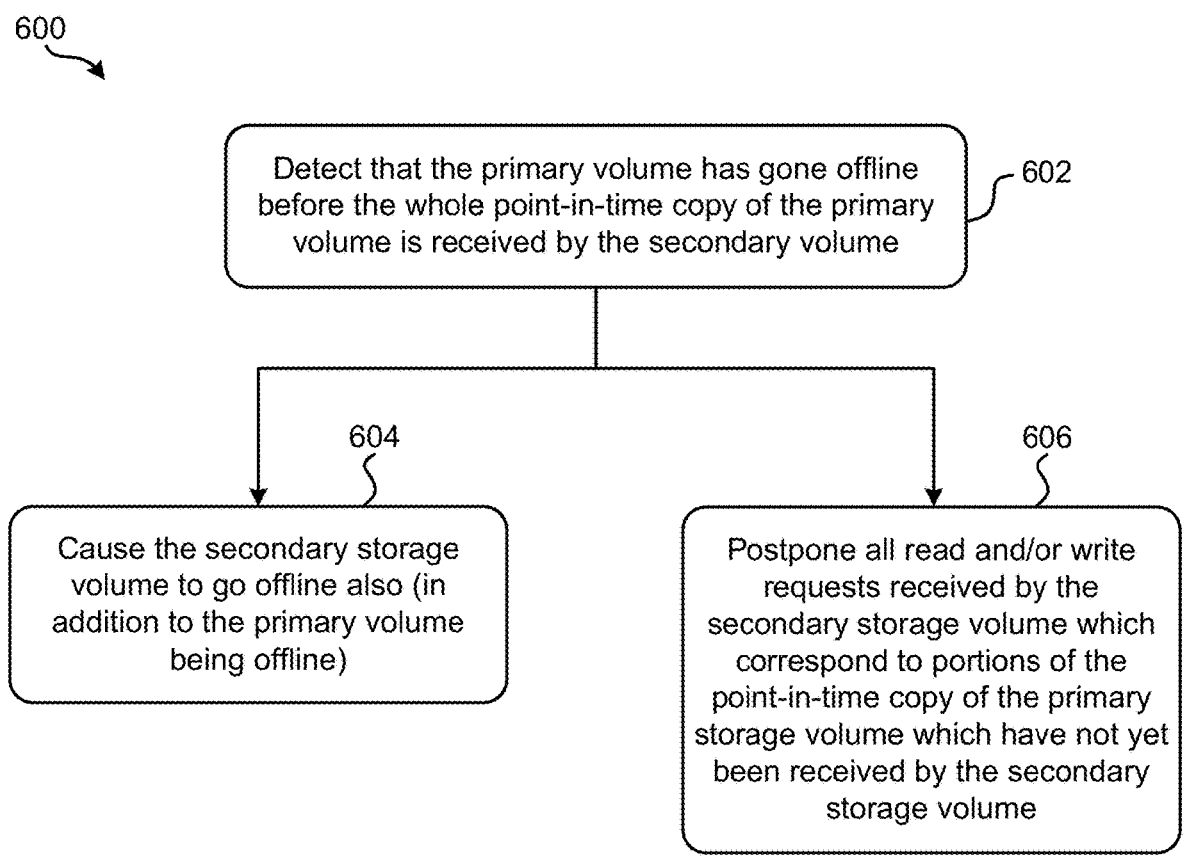
FIG. 6 is a flowchart of a method in accordance with one embodiment.

Accordingly, looking to FIG. 6, an exemplary method 600 for handling a system failure is illustrated according to one embodiment, which is in no way intended to limit the invention. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, operation 602 includes detecting that the primary volume has gone offline before the whole point-in-time copy of the primary volume is received by the secondary volume. According to various approaches, the detection in operation 602 may be made in response to receiving a notification from a user at the primary system that the primary volume has gone offline, in response to not receiving a status report from the primary system once a predetermined amount of time has passed since a last status report, upon experiencing a system timeout, etc.

Upon detecting that the primary volume has gone offline before the whole point-in-time copy of the primary volume is received by the secondary volume, the secondary system may take action in order to avoid data corruption. FIG. 6 illustrates two different exemplary operations which may be employed in order to avoid such data corruption. Which one or more of the two operations is actually implemented may be determined based on user input, automatically based on system conditions and/or parameters, based on information received from the primary system, etc.

Looking to operation 604, method 600 may include causing the secondary storage volume to go offline also (in addition to the primary volume being offline). By causing the secondary storage volume to go offline, no read and/or write requests may be processed by the secondary system, thereby avoiding any discrepancies from forming between the data included in the secondary storage volume at the secondary system and the primary storage volume at the primary system. It follows that once the primary storage volume is brought back online, the secondary storage volume may also be brought back online as well and replication of the point-in-time copy may resume where the primary and secondary systems left off prior to the primary storage volume going offline.

Alternatively, operation 606 includes postponing all read and/or write requests received by the secondary storage volume which correspond to portions of the point-in-time copy of the primary storage volume which have not yet been received by the secondary storage volume. In other words, the secondary storage volume remains online such that read and/or write requests which involve data which has already been stored in the secondary storage volume may be performed despite the primary storage volume being offline. However, read and/or write requests received by the secondary storage volume which pertain to data that has not yet been received from the primary storage volume are postponed to avoid discrepancies from forming between the data included in the secondary storage volume and the primary storage volume.

The read and/or write requests which are postponed may be stored in memory, e.g., such that they may be performed once the primary storage volume is brought back online. However, in some approaches the read and/or write requests received while the primary storage volume is offline may simply be rejected (e.g., failed). Again, once the primary storage volume is brought back online to a normal mode of operation, the secondary storage volume may also be brought back online as well. According to some approaches, once the secondary storage volume is brought back online, any postponed read and/or write requests may be performed prior to re-initiating replication of the point-in-time copy of the primary storage volume. Once resumed, replication of the point-in-time copy may continue where the primary and secondary systems left off prior to the primary storage volume going offline. Moreover, now that the secondary storage volume is in a normal mode of operation, received read and/or write requests which may have been postponed (or rejected altogether) while the primary storage volume was offline may be performed when received.

It follows that, a secondary storage system may receive replicated data from a volume in a remote primary storage system (relative to the secondary storage system) and efficiently form a copy of the volume by performing various ones of the operations described above with reference to FIG. 5. Moreover, read and/or write requests received during the replication process may be performed even before all the data corresponding to the volume being copied has been received. Thus, the data is instantly available at the secondary storage volume once the replication process has been initiated in that the data may be read and/or written to (overwritten, updated, appended to, etc.). This is a significant improvement in comparison to conventional products which are unable to perform read or write requests at a remote system until after the complete copy has been stored on the remote system.

Although the approaches included above were described from the secondary (e.g., DR) storage system's point of view, similar processes may be performed at the primary system in order to achieve these improvements as well. Accordingly, looking to FIG. 7, a method 700 for creating a copy of a data storage volume on a remote system is shown from a primary system's point of view according to one embodiment. Accordingly, one or more of the processes included in method 700 may include various ones of the approaches described above with reference to FIG. 5.

The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Moreover, each of the steps of the method 700 may be performed by any suitable component of the operating environment. For example, in various embodiments, the method 700 may be partially or entirely performed by a controller (e.g., see 430, 432 of FIG. 4), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Figure 7:
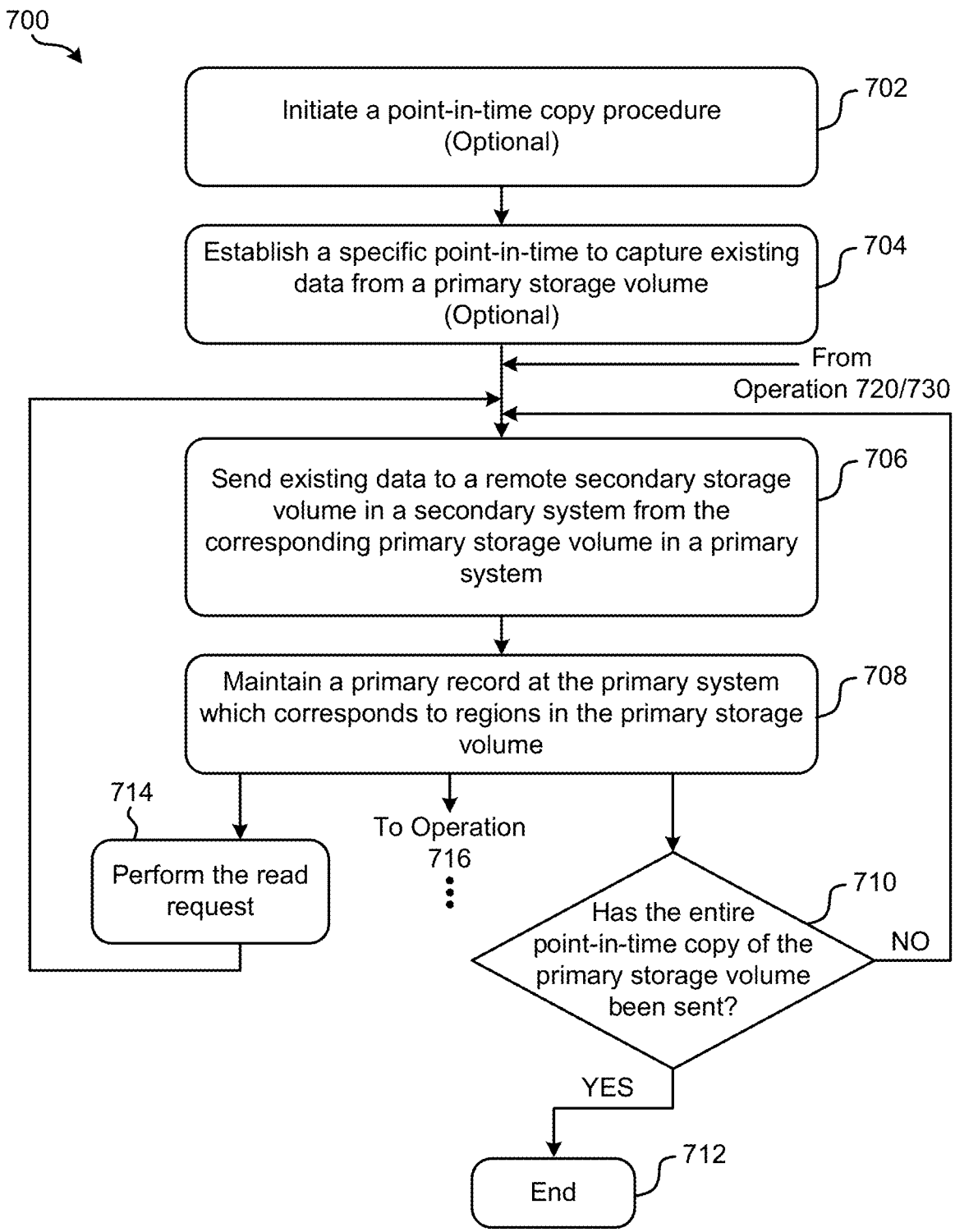
FIG. 7 is a flowchart of a method in accordance with one embodiment.
Figure 7:
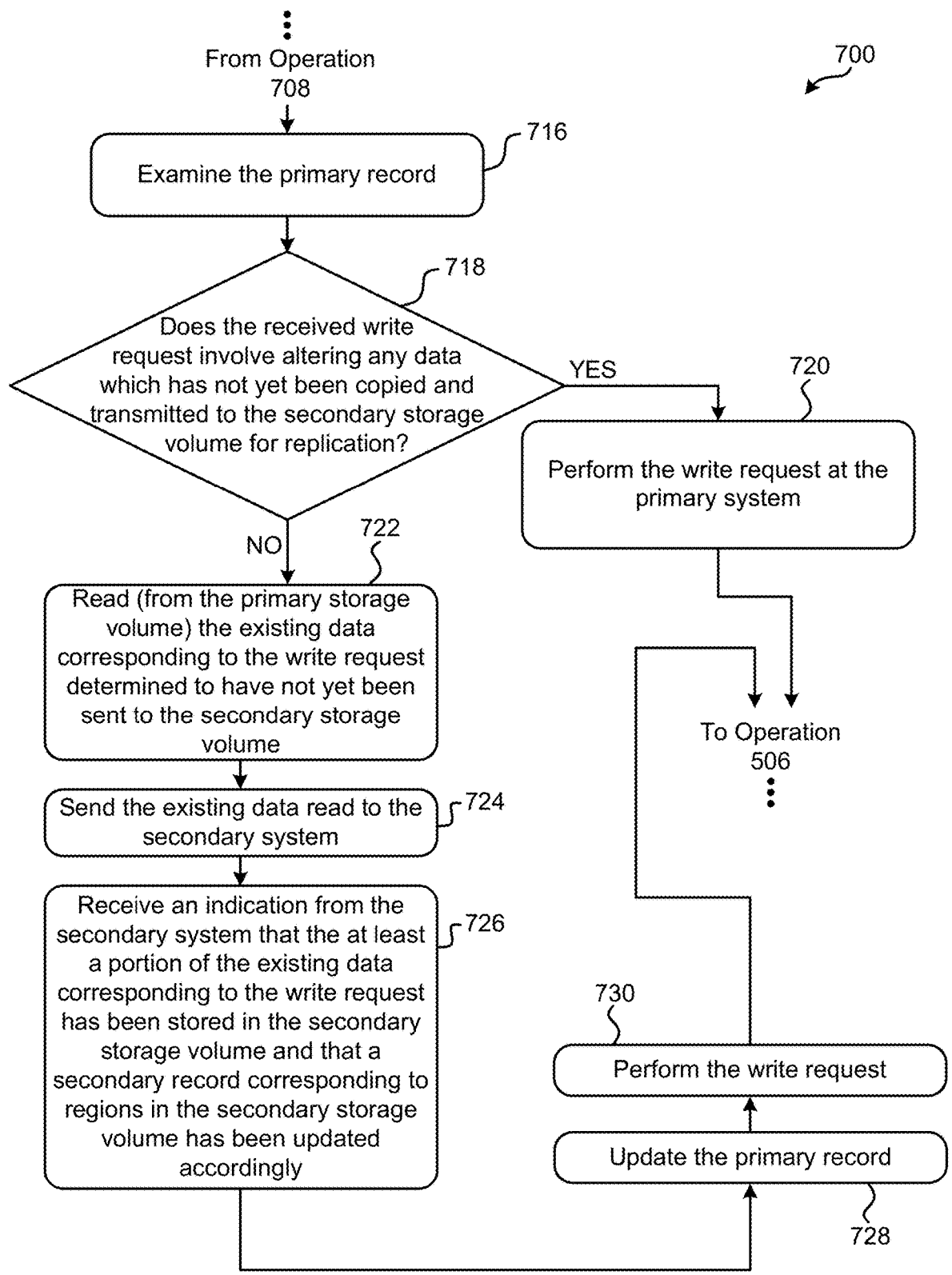

As shown in FIG. 7, optional operation 702 of method 700 includes initiating a point-in-time copy procedure. As previously mentioned, the ability to efficiently create point-in-time copies on remote systems is desirable for various reasons such as, being able to perform data analytics on host systems remote from the production location, storing backups offsite for better resiliency and cost (e.g., where land and/or power is less expensive), cloning to a remote system a volume that currently has a good state but which will shortly be modified with data that does not need to be replicated, cloning a volume to a new system and making the copy immediately readable and writable, etc. Accordingly, a point-in-time copy procedure may be initiated in response to a user request, a predetermined condition being met, etc.

Moreover, optional operation 704 includes establishing a specific point-in-time to capture existing data from the primary storage volume (the source volume) in response to the point-in-time copy procedure being initiated. The established point-in-time serves as a reference point at which data existing in the primary storage volume is captured and eventually sent to a secondary backup volume. Establishing the reference point-in-time is particularly desirable in distributed systems where each node of the system preferably agrees what writes form part of the point-in-time copy. According to various approaches, any manner of establishing a specific point-in-time which would be apparent to one skilled in the art after reading the present description may be employed. Moreover, once a specific point-in-time has been established, the steady state of the remote point-in-time copy system will be to copy uncopied regions of the primary storage volume to the secondary volume, e.g., as a part of a "background copy" process.

Operation 706 further includes sending existing data to a remote secondary storage volume in a secondary system from the corresponding primary storage volume in a primary system. As mentioned above, the existing data sent to the secondary storage volume may be a point-in-time copy of the data existing in the primary storage volume. Accordingly, the data sent may correspond to data existing in the primary storage volume as it were at an established point-in-time. The secondary storage volume may serve as a DR copy of the existing data in some approaches, e.g., should the primary volume be lost due to corruption, unintentional deletion, system failure, etc. It should again be noted that "existing data" as used herein is intended to refer to the data included in the primary storage volume which is being replicated onto (sent to) the secondary storage volume. Thus, according to an exemplary approach, "existing data" may be the data included in a point-in-time copy of the primary storage volume being replicated onto the secondary storage volume.

It is preferred that as the existing data is being sent to the secondary storage volume from the primary storage volume, the primary storage volume is made available for read and/or write access before the entire point-in-time copy of the primary storage volume has been copied to the secondary storage volume. Thus, read and/or write requests received at the primary system may be performed during the replication process. Moreover, it should again be noted that the "replication process" as used herein refers to the process of forming a copy of a primary storage volume on a remote system.

In order to achieve read and/or write functionality at the primary storage volume during the replication process, operation 708 includes maintaining a primary record at the primary system which corresponds to regions in the primary storage volume. According to an illustrative approach, the primary record may be a bitmap (e.g., see 414 of FIG. 4). Each bit of the bitmap may correspond to a respective region in the primary storage volume on which the existing data being sent in operation 706 is stored in its original form. Accordingly, in preferred approaches, maintaining the primary record includes indicating which of the regions in the primary storage volume contain data which has already been sent (e.g., transmitted) to the secondary system. As mentioned above, a "region" is a fixed-size quantity of the given volume. In other words, each region in a given volume is preferably the same size. However, different volumes may implement different sized regions, e.g., depending on the desired approach. Moreover, the primary record may be maintained according to any of the approaches described above with reference to the secondary record. For instance, in some approaches the primary record may be a bitmap which may be maintained by setting the bits to have a logical value which indicates whether the corresponding region of the primary storage volume contains data which has already been sent to the secondary system (and preferably successfully copied to the secondary storage volume).

As mentioned above, the primary and secondary records (particularly the secondary record) contain information which is important in ensuring a complete copy of the primary storage volume is formed in the secondary system, and it is therefore desirable that the primary and secondary records are managed in an appropriately resilient manner. According to an illustrative approach, the primary and/or secondary records may be maintained on a clustered system, preferably such that each of the bitmaps are stored on two or more different nodes in the respective clustered system. Moreover, it is preferred that each copy of the primary and secondary records is modified before any action is taken based on changing the bitmap state. In other words, it is preferred that the primary and secondary records are matched before any read and/or write operations are performed on either of the storage volumes. However, in other approaches, a storage system may implement other solutions for ensuring appropriately resilient data, e.g., such as storing the primary and/or secondary records as multiple on-disk copies.

Existing data may continue to be sent to the secondary storage volume from the primary storage volume until the entire point-in-time copy of the primary storage volume has been sent. Accordingly, with continued reference to FIG. 7, decision 710 includes determining whether the entire point-in-time copy of the primary storage volume has been sent to the secondary system. The outcome of decision 710 may be determined a number of different ways depending on the approach. For instance, in some approaches the primary system may receive a notification from the secondary system that the entire point-in-time copy of the primary storage volume has been successfully stored in the secondary storage volume. In other approaches, the primary system may deduce that the entire point-in-time copy of the primary storage volume has been sent to the secondary storage volume once all the bits in a bitmap associated with the primary storage volume have been set to indicate each of the regions in the primary storage volume have been sent to the secondary system.

As shown, method 700 returns to operation 706 in response to determining that the entire point-in-time copy of the primary storage volume has not yet been sent, whereby additional existing data may be sent to the secondary storage volume. However, method 700 may alternatively proceed to operation 712 and subsequently end in response to determining that the entire point-in-time copy of the primary storage volume has been sent to the secondary system. As previously mentioned, this may be reflected in the primary and secondary records, where the primary record will indicate that data from all regions in the primary storage volume has been sent to the secondary storage volume, and the secondary record will indicate that all regions in the secondary storage volume contain data received from the primary system. However, it should be noted that in various approaches, method 700 may return to operation 702 and re-initiate a point-in-time copy procedure, e.g., in response to being prompted with a data transmission request from a separate storage system, a user input, a predetermined condition being met, etc.

As alluded to above, read and/or write requests may be received at the primary system before the entire point-in-time copy of the primary storage volume has been sent to the secondary system. Accordingly, the flowchart of method 700 may proceed to operation 714 and/or 716 depending on whether a read request and/or a write request is received at the primary system before the entire point-in-time copy of the primary storage volume has been sent. The flowchart of FIG. 7 has thereby been separated into three different paths which stem from operation 708. Thus, depending on the given situation, method 700 may proceed differently from operation 708, e.g., as will soon become apparent.

Again, read requests may be received while existing data is being sent to the remote secondary system. In response to receiving such a read request for data at the primary system, method 700 preferably proceeds to operation 714. There, operation 714 includes performing the read request. While performing read requests at the secondary storage volume involve additional operations and/or determinations, a read request may be performed at the primary storage volume at any time because a full copy of the volume exists there. Thus, the data corresponding to a read request received at the secondary system is already stored in the secondary storage volume, and may be read.

Once the read request has been performed, method 700 returns to operation 706 whereby additional existing data may be sent to the secondary system. Moreover, any of the other processes included in method 700 may be repeated as additional write and/or read requests are received.

Returning to operation 708, as mentioned above, read and/or write requests may be received at the primary system before the entire point-in-time copy of the primary storage volume has been sent to the secondary system. Accordingly, the flowchart of method 700 may proceed from operation 708 to operation 714 and/or 716 depending on whether a read request and/or a write request is received before the entire point-in-time copy of the primary storage volume has been sent. In response to receiving write request at the primary system corresponding to the primary storage volume, method 700 preferably proceeds to operation 716. There, operation 716 includes examining the primary record.

As mentioned above, the primary record may be a bitmap, the bits of which may be examined to determine whether a portion of the existing data being sent to the secondary storage volume has already been sent to the secondary storage volume. Accordingly, decision 718 includes determining whether existing data corresponding to the write request has already been copied to the secondary storage volume. In other words, decision 718 includes determining whether the received write request involves altering any data which has not yet been copied and transmitted to the secondary storage volume for replication.

As shown, method 700 proceeds to operation 720 in response to determining that all the existing data corresponding to the write request has already been copied to the secondary storage volume. There, operation 720 includes performing the write request at the primary system. Thereafter, method 700 returns to operation 706 whereby additional existing data may be sent to the secondary storage volume. It should be noted that write requests may be performed by padding out the write operations to a corresponding number of the regions in the respective storage volume, e.g., as would be appreciated by one skilled in the art after reading the present description.

However, returning to decision 718, method 700 proceeds to operation 722 in response to determining that at least a portion of the existing data corresponding to the write request has not already been sent to the secondary storage volume. As shown, operation 722 includes reading the existing data corresponding to the write request determined to have not yet been sent to the secondary storage volume, the existing data being read from the primary storage volume. Moreover, operation 724 includes sending the existing data read in operation 722 to the secondary system. Accordingly, operations 722 and 724 ensure that any existing data stored in the primary storage volume which will be affected by (e.g., updated, overwritten, appended to, etc.) a received write request is copied in its original form to the secondary storage volume before the received write operation is performed. Thus, the point-in-time copy formed on the secondary storage volume matches the data as it was in the primary storage volume at the specific point-in-time established in operation 704, thereby desirably avoiding data corruption and/or discrepancies between the primary and secondary storage volumes.

The primary system may delay performance of the received write request until an indication is received from the secondary system which signals that the at least a portion of the existing data corresponding to the write request has been stored in the secondary storage volume and that a secondary record corresponding to regions in the secondary storage volume has been updated accordingly. See operation 726. Delaying performance of the write request until the indication is received from the secondary system may desirably ensure that the existing data sent in operation 724 has been successfully stored in regions of the secondary storage volume. Thus, should any issues occur at the secondary system while attempting to store the existing data in the secondary storage volume, the primary system is able to resend the existing data as it has not yet been altered by the write request.

Furthermore, operation 728 of method 700 includes updating the primary record in response to receiving the indication as described in relation to operation 726. As mentioned above, it is desirable that the primary and secondary records maintain a record of which portions of the data in the primary storage volume have been replicated in the secondary storage volume. The message received from the secondary system allows for the primary system to be informed of any updates which have occurred to the regions of the secondary storage volume and/or the secondary record itself. Thus, the message received in operation 726 may effectively have been sent from the secondary system to update the primary record in order to indicate which portions of the point-in-time copy of the primary storage volume have been received by, and implemented in, the secondary system.

Thereafter, operation 730 includes performing the write request. It should be noted that although the embodiment illustrated in FIG. 7 indicates that the write request is performed in response to receiving the indication and updating the primary record, in other embodiments the write request may be performed in response to receiving an indication as seen in operation 726, in response to updating the primary record as seen in operation 726, in response to simply sending the existing data to the secondary system as seen in operation 722, etc., or according to any other desired progression. Moreover, rather than waiting for all data corresponding to the write request to be written to the secondary storage volume before performing the full write request on the primary storage system, portions of the write request may be performed on individual regions in the primary storage volume as indications are received that corresponding regions of the secondary storage volume have been successfully filled (written to) and secondary record has been updated accordingly.

Thereafter, method 700 returns to operation 706 whereby additional existing data may be sent to the secondary storage volume. Once the read request has been performed, method 700 returns to operation 706 whereby additional existing data may be sent to the secondary system. Moreover, any of the other processes included in method 700 may be repeated as additional existing data is sent to the secondary system, write requests are received, read requests are received, etc.

However, it should be noted that if multiple write requests are received in quick succession at the primary system, each of which correspond to a same region, the write requests received after a first write request for the region are preferably postponed. The primary system is preferably able to detect that there is an outstanding (ongoing) write request corresponding to the given region in the primary storage volume, and therefore the performance of subsequent write requests to that same region may be postponed until the data corresponding to the outstanding request is written to the region. By postponing subsequently received write requests which correspond to a same region as an outstanding write request, more than one write request may be satisfied at once. In other words, if the primary system is already in the process of sending data to the secondary system, that transmission of data may be used to perform more than one write request rather than sending multiple copies of the data to the secondary system. Likewise, if the primary system has a write request outstanding while sending data from a same region of the primary storage volume for a different reason not related to the write request, the primary system may act as though the data being sent is in response to issuing a transmission corresponding to the outstanding write request. By transmitting the data from the primary system to the secondary system only once, the configuration is able to avoid a more complex scheme to ensure successful data transfer and write performance, thereby ensuring efficiency. Moreover, if the primary system is aware that data has been pulled from the secondary system for a given region, but the indication that the secondary record has been set has not yet been received at the primary system, any write requests to that same region may not be performed by the primary system, but instead will wait for the data transfer to the secondary system to complete (e.g., receive the indication in operation 726.

Should the secondary system go offline (e.g., due to a system failure) during the replication process described in method 700 before the whole copy of the secondary volume has been sent to the secondary storage volume, it is preferred that appropriate action is taken to avoid data corruption and replication failure.

Figure 8:
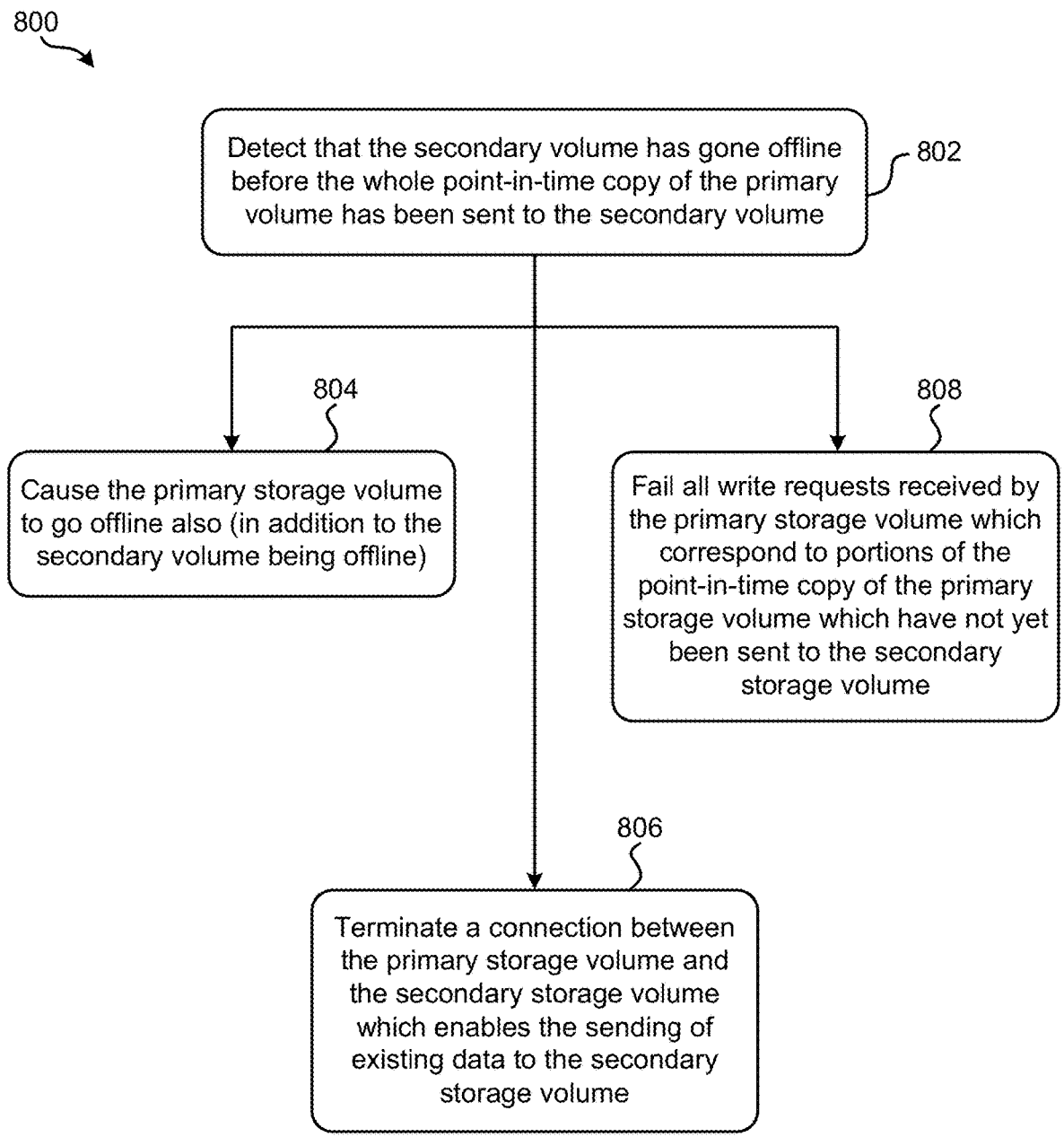
FIG. 8 is a flowchart of a method in accordance with one embodiment.

Accordingly, looking to FIG. 8, an exemplary method 800 for handling a system failure is illustrated according to one embodiment, which is in no way intended to limit the invention. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, operation 802 includes detecting that the secondary volume has gone offline before the whole point-in-time copy of the primary volume has been sent to the secondary volume. According to various approaches, the detection in operation 802 may be made in response to receiving a notification from a user at the secondary system that the secondary volume has gone offline, in response to not receiving a status report from the secondary system once a predetermined amount of time has passed since a last status report, upon experiencing a system timeout, etc.

Upon detecting that the secondary volume has gone offline before the whole point-in-time copy of the primary volume has been sent to the secondary storage volume, the primary system may take action in order to avoid data corruption. FIG. 8 illustrates three different exemplary operations which may be employed in order to avoid such data corruption. Which one or more of the three operations is actually implemented may be determined based on user input, automatically based on storage system conditions and/or parameters, based on information received from the primary system, etc. Moreover, it is preferred that information regarding whether the primary and/or secondary storage volumes are online or offline is preferably shared between the systems in order to assist in determining which of the following operations should be performed.

Looking to operation 804, method 800 may include causing the primary storage volume to go offline also (in addition to the secondary volume being offline). By causing the primary storage volume to go offline, no read and/or write requests may be processed by the primary system, thereby avoiding any discrepancies from forming between the data included in the secondary storage volume at the secondary system and the primary storage volume at the primary system. It follows that once the secondary storage volume is brought back online, the primary storage volume may also be brought back online as well and replication of the point-in-time copy may resume where the primary and secondary systems left off prior to the primary storage volume going offline.

Moreover, operation 806 includes terminating a connection between the primary storage volume and the secondary storage volume which enables the sending of existing data to the secondary storage volume. By terminating the connection between the primary and secondary storage volumes, the primary system may desirably be prevented from performing write requests at the primary storage volume while the secondary storage volume is offline. It follows that in some approaches, operation 806 may be performed in response to receiving a write request at the primary system which corresponds to portions of the point-in-time copy of the primary storage volume which have not yet been sent to the secondary storage volume.

In some approaches, operation 806 may be achieved by simply terminating the connection between the primary and secondary systems. According to an example, which is in no way intended to limit the invention, a network connection extending between the primary and secondary systems (e.g., see 406 of FIG. 4) may be terminated. However, it should be noted that the connection between the primary and secondary systems is preferably restored after the secondary system is back online. Depending on the manner in which the connection between the primary and secondary systems was terminated, restoring the connection may be performed in any manner which would be apparent to one skilled in the art after reading the present description.

With continued reference to FIG. 8, operation 808 includes failing all write requests received by the primary storage volume which correspond to portions of the point-in-time copy of the primary storage volume which have not yet been sent to the secondary storage volume. In other words, the primary storage volume may remain online such that any read request and/or write requests which involve data which has already been sent to and stored in the secondary storage volume may be performed despite the secondary storage volume being offline. However, write requests received by the primary storage volume which pertain to data that has not yet been sent to the secondary storage volume are failed to avoid discrepancies from forming between the data included in the secondary storage volume and the primary storage volume.

However, in some approaches, rather than failing all write requests received by the primary storage volume which correspond to portions of the point-in-time copy of the primary storage volume which have not yet been sent to the secondary storage volume, these received write requests may simply be postponed. The write requests which are postponed may be stored in memory, e.g., such that they may be performed once the secondary storage volume is brought back online. Again, once the secondary storage volume is brought back online to a normal mode of operation, the primary storage volume may also be brought back online as well. According to some approaches, once the primary storage volume is brought back online, any postponed read and/or write requests may be performed prior to re-initiating replication of the point-in-time copy of the primary storage volume. Once resumed, replication of the point-in-time copy may continue where the primary and secondary systems left off prior to the secondary storage volume going offline. Moreover, now that the primary storage volume is in a normal mode of operation, received write requests which may have been postponed (or rejected altogether) while the secondary storage volume was offline may be performed when received.

As a result, various embodiments described herein are able to achieve instantly-available data replication for point-in-time copies of a primary storage volume. As previously mentioned, it should be noted that "instantly-available" is intended to mean that read and write requests may be performed even during the synchronization process of creating the point-in-time copy of the volume. In other words, upon initiating some of the processes described herein, a point-in-time copy of the data included in a storage volume at a remote location (relative to the source copy of the volume) may be read from and/or written to directly upon request. In practical terms this means that the second image (the copy) is made available in much less time than the amount of time it would take to create a true, separate, physical copy.

The improvements achieved by enabling this functionality are significant in comparison to conventional products. As previously mentioned, conventional products experience significant drawbacks involved with attempting to create a point-in-time copy of a volume on a remote system. These drawbacks in conventional products include long delays before any data may be read from and/or written to the copy, consumption of an undesirably high amount of the source system's storage, etc. In sharp contrast, various embodiments described herein may be able to achieve an improved process of creating instantly available point-in-time copies of volumes on remote systems, which is able to increase system throughput, improve system efficiency, improve access to data, etc.

As previously mentioned, the redundant point-in-time copy stored in the secondary storage volume may be used to recover the primary storage volume of the primary system in response to experiencing a hardware failure, a software failure, unintentional deletion of data, etc., or any other reason which may cause the primary storage volume to lose the data previously stored therein. Moreover, it should be noted that although various ones of the approaches included herein are described in relation to creating a point-in-time copy on a remote system, any desired type of data copy may be created using the same or similar processes included herein as would be appreciated by one skilled in the art after reading the present description.

Various in-use examples, which are in no way intended to limit the invention, are described below. It should be noted that any of the following in-use examples may be implemented with any of the approaches described above, e.g., depending on the desired embodiment, as would be appreciated by one skilled in the art after reading the present description.

Consistency Groups

According to an in-use example, which is in no way intended to limit the invention, the ability to process data across multiple volumes in a consistent way is desired. In order to do so, it is important to provide the capability to capture data on the primary system across an arbitrary set of volumes. This may be achieved by defining one or more volumes to belong to a "consistency group". Depending on the embodiment, there may be any number of consistency groups in a given storage system. However, the key point at which consistency group is crucial to a volume is when the specific point-in-time is established prior to replication being initiated between the primary and secondary storage volumes, e.g., see optional operations 502, 702 above. Moreover, it is desirable that the point-in-time is established across all volumes in the consistency group, which may be performed according to any procedure which would be apparent to one skilled in the art after reading the present description. For instance, establishing the point-in-time across more than one volume in a consistency group may be performed using a FlashCopy operation.

Once the point-in-time has been established, the consistency group membership of the volumes may be inconsequential. In some approaches, the source (primary) volumes and the backup (secondary) volumes may be managed as an entire consistency group for simplicity. However, the various processes described above with reference to FIGS. 5-8 may not be modified.

Adjusting Background Copy

According to another in-use example, which is in no way intended to limit the invention, it may be desirable that a user is able to choose to prioritize or deprioritize a background copy process. According to the present description, a "background copy process" refers to the data replication process described according to the various embodiments above. This prioritization or deprioritization may be achieved by assigning the background copy procedure more or less of the bandwidth respectively, between the primary and secondary systems. Deprioritizing and slowing the background copy process leaves more bandwidth available to perform read and/or write requests that are received, but also results in a greater proportion of the read and/or write requests being unable to be performed without requesting the additional transfer of data between the systems (e.g., see operations 546, 722 above). Moreover, the secondary (backup) system will depend on the primary (source) system for a longer period of time. Therefore the tradeoff between available bandwidth and processing time may be weighed depending on the particular situation.

For example, if it is more important (e.g., to a user) that the primary storage volume is independent of the primary storage volume, the background copy process may even be modified to be disabled (or slowed to a zero rate). Accordingly, regions that have been read will be cached on the secondary system for subsequent access, while writes are stored on the secondary system. Such use may tend to result in the secondary storage volume becoming a temporary copy, to be discarded after use. Moreover, because unread and/or unwritten regions will not be copied, this scheme may save on bandwidth between systems. Furthermore, if the secondary storage volume is thin-provisioned, this may also lower the storage requirements on the secondary system.

Predicting What to Prioritize With Background Copy

According to another in-use example, various ones of the embodiments described herein may be extended to perform intelligent background copies of the regions most likely to be read and/or written to, thereby desirably minimizing the copy overhead.

According to different approaches, the regions most likely to be read and/or written to may be determined based on a number of different factors. One such factor includes detecting sequential reads and/or writes, whereby a background copy for the next few regions may be prioritized. Another factor includes examining historical knowledge of hot regions of the given storage volume which may be acquired from software that matches volume regions to the appropriate tier of storage, e.g., such as IBM Easy Tier. Another factor includes determining whether the source volume is thin-provisioned, whereby allocated regions should be prioritized ahead of unallocated regions. Yet another factor includes determining whether the data layout of the volume is known, whereby the most frequently-used parts of the storage volume may be located in well-defined regions and may thereby be prioritized. However various other factors may have an effect on what to prioritize with a background copy process.

Optimizing Writing Data to the Secondary Storage Volume

According to yet another in-use example, if multiple writes to a single region on the secondary storage volume are received by the secondary system in quick succession, the write requests received after the first write request may be postponed until any missing data has been retrieved. Subsequent write requests may be merged into the retrieved data and applied as part of the same write operation. If enough writes are submitted to the secondary storage volume such that an entire region is covered, while that region is being retrieved, those writes may be applied immediately and completed back to the host. Moreover, secondary record may be updated as soon as the writes complete, and a message may be sent to the production system to dirty the primary record, even while the region is being retrieved. The retrieved data may be ignored when it later arrives. As a result, sequential writes to the secondary storage volume may result in improved performance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving existing data at a secondary storage volume in a secondary system from a primary storage volume in a primary system, wherein the existing data received by the secondary storage volume is a point-in-time copy of the primary storage volume;
maintaining a secondary record which corresponds to regions in the secondary storage volume,
wherein maintaining the secondary record includes indicating which of the regions in the secondary storage volume have been written to; and in response to receiving a write request at the secondary system:
  determining whether data corresponding to at least a portion of the write request will fully overwrite one or more of the regions in the secondary storage volume;
  performing the at least a portion of the write request in response to determining that the data corresponding to the at least a portion of the write request will fully overwrite one or more of the regions in the secondary storage volume;
  sending a request to the primary system for existing data corresponding to a portion of one or more respective regions in the secondary storage volume in response to determining that the data corresponding to at least a portion of the write request will not overwrite a portion of the one or more respective regions in the secondary storage volume;
  receiving the requested existing data from the primary system;
  merging the requested existing data with the data corresponding to the at least a portion of the write request determined will not overwrite the portion of the one or more respective regions in the secondary storage volume;
  writing the merged data to the one or more respective regions in the secondary storage volume;
  updating the secondary record; and
  sending a message to the primary system indicating the update to the secondary record, the message being for updating a primary record which indicates which portions of the point-in-time copy of the primary storage volume have been implemented in the secondary storage volume.

2. The computer-implemented method of claim 1, wherein the secondary system is remote from the primary system.

3. The computer-implemented method of claim 1, wherein the primary and secondary records are bitmaps, wherein each bit of the bitmaps corresponds to a single region of the respective primary and secondary volumes.

4. The computer-implemented method of claim 3, wherein each of the bitmaps is stored on two or more nodes in a clustered system.

5. The computer-implemented method of claim 1, wherein upon detecting that the primary storage volume has gone offline before the whole point-in-time copy of the primary storage volume is received by the secondary storage volume, causing the secondary storage volume to go offline also.

6. The computer-implemented method of claim 1, wherein upon detecting that the primary storage volume has gone offline before the whole point-in-time copy of the primary storage volume is received by the secondary storage volume, postponing all read and write requests received by the secondary storage volume which correspond to portions of the point-in-time copy of the primary storage volume which have not yet been received by the secondary storage volume.

7. The computer-implemented method of claim 1, wherein write requests are received at the secondary system by a single node in a clustered system.

8. A system, comprising:
  a processor; and
  logic integrated with the processor, executable by the processor, or integrated with and executable by the processor, the logic being configured to:
    receive, by the processor, existing data at a secondary storage volume in a secondary system from a primary storage volume in a primary system, wherein the existing data received by the secondary storage volume is a point-in-time copy of the primary storage volume;
    maintain, by the processor, a secondary record which corresponds to regions in the secondary storage volume,
    wherein maintaining the secondary record includes indicating which of the regions in the secondary storage volume have been written to; and
    in response to receiving a write request at the secondary system:
      determine, by the processor, whether data corresponding to at least a portion of the write request will fully overwrite one or more of the regions in the secondary storage volume,
      perform, by the processor, the at least a portion of the write request in response to determining that the data corresponding to the at least a portion of the write request will fully overwrite one or more of the regions in the secondary storage volume,
      send, by the processor, a request to the primary system for existing data corresponding to a portion of one or more respective regions in the secondary storage volume in response to determining that the data corresponding to at least a portion of the write request will not overwrite a portion of the one or more respective regions in the secondary storage volume,
      receive, by the processor, the requested existing data from the primary system,
      merge, by the processor, the requested existing data with the data corresponding to the at least a portion of the write request determined will not overwrite the portion of the one or more respective regions in the secondary storage volume,
      write, by the processor, the merged data to the one or more respective regions in the secondary storage volume,
      update, by the processor, the secondary record, and
      send, by the processor, a message to the primary system indicating the update to the secondary record, the message being for updating a primary record which indicates which portions of the point-in-time copy of the primary storage volume have been implemented in the secondary storage volume.

9. The system of claim 8, wherein the secondary system is remote from the primary system.

10. The system of claim 8, wherein the primary and secondary records are bitmaps, wherein each bit of the bitmaps corresponds to a single region of the respective primary and secondary volumes.

11. The system of claim 10, wherein each of the bitmaps is stored on two or more nodes in a clustered system.

12. The system of claim 8, wherein upon detecting that the primary storage volume has gone offline before the whole point-in-time copy of the primary storage volume is received by the secondary storage volume, causing the secondary storage volume to go offline also.

13. The system of claim 8, wherein upon detecting that the primary storage volume has gone offline before the whole point-in-time copy of the primary storage volume is received by the secondary storage volume, postponing all read and write requests received by the secondary storage volume which correspond to portions of the point-in-time copy of the primary storage volume which have not yet been received by the secondary storage volume.

14. The system of claim 8, wherein write requests are received at the secondary system by a single node in a clustered system.

15. A computer program product comprising a computer readable storage medium having program instructions embodied therewith, the program instructions readable and/or executable by a processor to cause the processor to:
receive, by the processor, existing data at a secondary storage volume in a secondary system from a primary storage volume in a primary system, wherein the existing data received by the secondary storage volume is a point-in-time copy of the primary storage volume;
maintain, by the processor, a secondary record which corresponds to regions in the secondary storage volume,
wherein maintaining the secondary record includes indicating which of the regions in the secondary storage volume have been written to; and
in response to receiving a write request at the secondary system:
determine, by the processor, whether data corresponding to at least a portion of the write request will fully overwrite one or more of the regions in the secondary storage volume;
perform, by the processor, the at least a portion of the write request in response to determining that the data corresponding to the at least a portion of the write request will fully overwrite one or more of the regions in the secondary storage volume;
send, by the processor, a request to the primary system for existing data corresponding to a portion of one or more respective regions in the secondary storage volume in response to determining that the data corresponding to at least a portion of the write request will not overwrite a portion of the one or more respective regions in the secondary storage volume;
receive, by the processor, the requested existing data from the primary system;
merge, by the processor, the requested existing data with the data corresponding to the at least a portion of the write request determined will not overwrite the portion of the one or more respective regions in the secondary storage volume;
write, by the processor, the merged data to the one or more respective regions in the secondary storage volume;
update, by the processor, the secondary record; and
send, by the processor, a message to the primary system indicating the update to the secondary record, the message being for updating a primary record which indicates which portions of the point-in-time copy of the primary storage volume have been implemented in the secondary storage volume.

16. The computer program product of claim 15, wherein the secondary system is remote from the primary system.

17. The computer program product of claim 15, wherein the primary and secondary records are bitmaps, wherein each bit of the bitmaps corresponds to a single region of the respective primary and secondary volumes.

18. The computer program product of claim 15, wherein upon detecting that the primary storage volume has gone offline before the whole point-in-time copy of the primary storage volume is received by the secondary storage volume, causing the secondary storage volume to go offline also.

19. The computer program product of claim 15, wherein upon detecting that the primary storage volume has gone offline before the whole point-in-time copy of the primary storage volume is received by the secondary storage volume, postponing all read and write requests received by the secondary storage volume which correspond to portions of the point-in-time copy of the primary storage volume which have not yet been received by the secondary storage volume.

20. The computer program product of claim 15, wherein write requests are received at the secondary system by a single node in a clustered system.

* * * * *